(12) United States Patent
Vicat-Blanc

(10) Patent No.: US 11,196,637 B2
(45) Date of Patent: Dec. 7, 2021

(54) SYSTEMS AND METHODS FOR MODELING AND SIMULATING AN IOT SYSTEM

(71) Applicant: Pascale Vicat-Blanc, Emerald Hills, CA (US)

(72) Inventor: Pascale Vicat-Blanc, Emerald Hills, CA (US)

(*) Notice: Subject to any disclaimer, the term of this patent is extended or adjusted under 35 U.S.C. 154(b) by 222 days.

(21) Appl. No.: 16/413,004

(22) Filed: May 15, 2019

(65) Prior Publication Data
US 2019/0356556 A1    Nov. 21, 2019

Related U.S. Application Data

(60) Provisional application No. 62/671,955, filed on May 15, 2018.

(51) Int. Cl.
| | | |
|---|---|---|
| G06F 17/00 | (2019.01) | |
| H04L 12/24 | (2006.01) | |
| G06F 30/20 | (2020.01) | |

(52) U.S. Cl.
CPC ............ H04L 41/145 (2013.01); G06F 30/20 (2020.01)

(58) Field of Classification Search
CPC .................................................. G06F 17/5022
USPC .......................................................... 703/13
See application file for complete search history.

(56) References Cited

U.S. PATENT DOCUMENTS

| | | | | |
|---|---|---|---|---|
| 2016/0065653 A1* | 3/2016 | Chen | ........................ | H04L 67/34 715/735 |
| 2016/0291826 A1* | 10/2016 | Verzano | ................ | H04L 41/145 |
| 2018/0063250 A1* | 3/2018 | Justin | ..................... | H04L 67/125 |
| 2019/0068455 A1* | 2/2019 | Randolph | ................ | H04W 4/38 |
| 2020/0065123 A1* | 2/2020 | Yang | ........................ | G06F 9/455 |
| 2020/0162500 A1* | 5/2020 | Ciocarlie | ................ | H04L 63/20 |

OTHER PUBLICATIONS

Gabriele D'Angelo et al., "Modeling the Internet of Things: a Simulation Perspective," Proceedings of the IEEE 2017 International Conference on High Performance Computing and Simulation (HPCS 2017), 10 pages.

Gabriele D'Angelo et al., "Simulation of the Internet of Things," Proceedings of the IEEE 2016 International Conference on High Performance Computing and Simulation (HPCS 2016) 8 pages.

* cited by examiner

*Primary Examiner* — Andy Ho
(74) *Attorney, Agent, or Firm* — Kwan & Olynick LLP

(57) ABSTRACT

Methods and systems to model, simulate and continuously analyze global non-functional properties, such as profitability, availability, security and performance, of complex Internet of Things (IoT) systems. This modeling enables the collaborative design, interoperability, documentation, simulation, testing, deployment, operations, analysis and optimization of connected services and IoT infrastructures. Various embodiments of the present invention may be characterized as a tool for modeling an IoT system and controlling the evolution of this system. The present invention enables a customer or any entity to describe and simulate an IoT system in different scenarios and, in turn, derive various estimates for what the customer will have to invest. This is of great benefit to entities since building out and implementing a complex IoT system is likely an expensive and time and resource consuming endeavor.

17 Claims, 20 Drawing Sheets

FIG 13
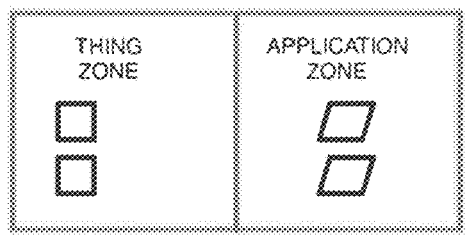
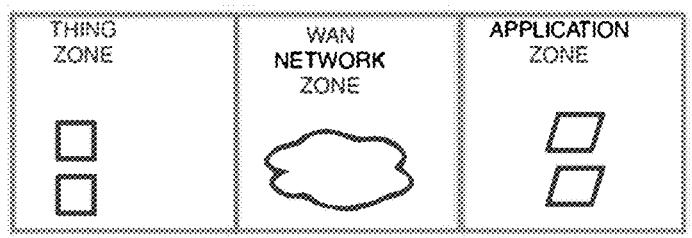
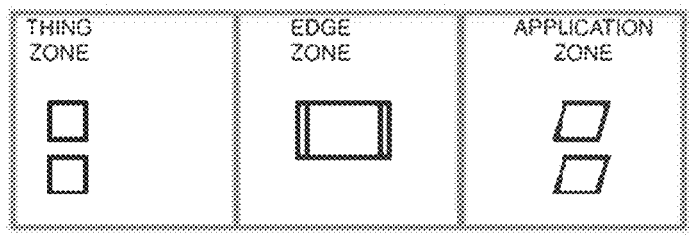
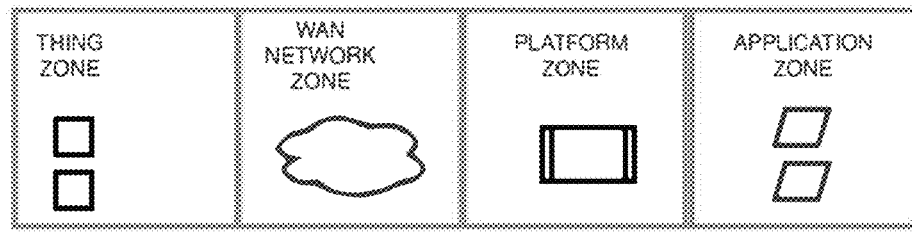
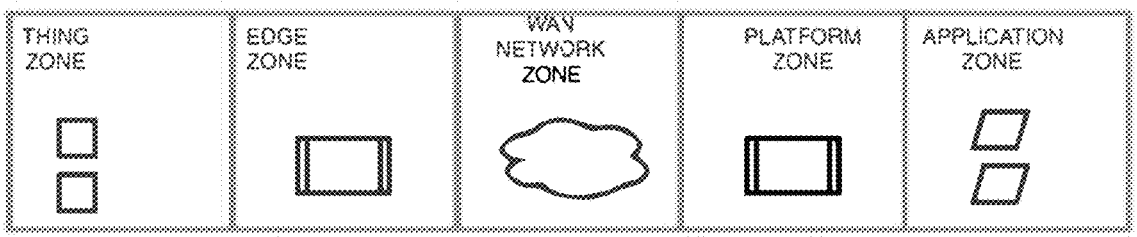

FIG 21
Example 1
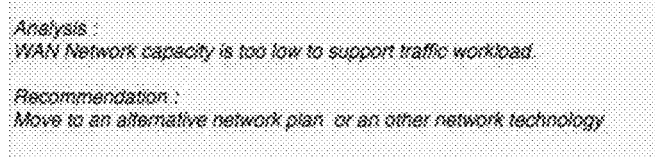
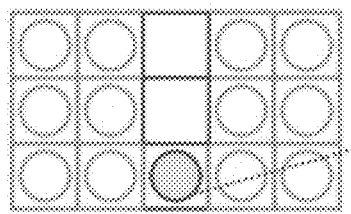
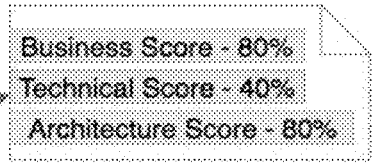
TENPA1
Example 2
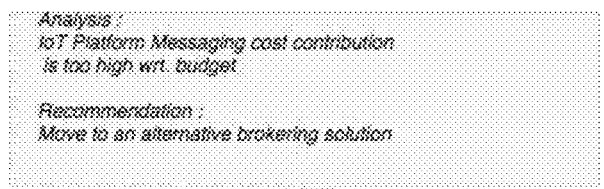
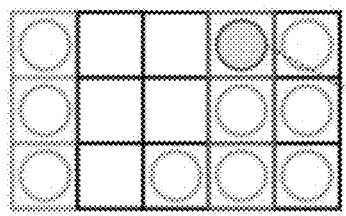
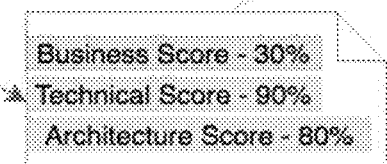
TNPA

SYSTEMS AND METHODS FOR MODELING AND SIMULATING AN IOT SYSTEM

CROSS-REFERENCE TO RELATED APPLICATIONS

This applications claims priority under 35 U.S.C. § 119(e) to United States Provisional Patent Application No. 62/671,955 filed May 15, 2018, entitled "TOT SYSTEM MODELING METHOD AND APPARATUS", which is incorporated by reference in its entirety for all purposes.

BACKGROUND

Field

Disclosed herein is information that relates to software for simulations and networks, specifically to Internet of Things networks and systems. More specifically, it relates to creating models for IoT networks that can be simulated, studied, and evolved.

Description of the Related Art

Connected environments and services like connected vehicles, connected cities or connected health are being deployed everywhere, spreading very fast in any industry and will be mainstream in the near future. To support these services, underlying systems, named Internet of Thing systems are developed and deployed. Relying on Internet protocols stack, they inherit from the robustness, scalability and ubiquitous properties of the Internet infrastructure and have the same network effect potential.

While the goal of the legacy Internet was to interconnect open systems and enable best effort data communication, the Internet of Things technology aims at interconnecting the constrained physical world (the things) with the virtual world (the applications or end-user services). For achieving this, the underlying infrastructure needs to deliver continuous, secure and reliable device connectivity, to enable real-time communications, but also to collect and process massive amounts of data. These new tasks require that IoT systems leverage complex interconnections of physical and software-defined components that should work in concert to ensure that connectivity, communication and data management are safe and accurate. Specialized components are in charge of moving data packets, other of maintaining secured connections, while other entities are responsible for processing, analyzing, storing or delivering data at the right time, at the right place at the right cost with the right security and privacy level.

These systems comprising millions of heterogeneous components are very difficult to design, to deploy and maintain end-to-end. Today, the design and deployment of IoT infrastructures and applications is an art involving different teams and many stakeholders working often in silos. Also, the existing IoT systems already deployed and in production are difficult to secure, optimize and evolve.

The traditional approaches used by IT teams or Network operators for designing networks or cloud system reach their limits. Making dozen of consistent decisions to build and operate a cyber-physical system is becoming critical and highly challenging not only for technical IT teams but also for C-level, IoT business owners, teams that are not used to collaborate tightly and to share common perspectives.

This situation slows down the adoption of the IoT technology and increases risks for companies already in it. These risks and delays endanger the competitiveness and sustainability of IoT product manufacturers, IoT service providers and IoT solutions vendors.

In view of the above, the situation can be changed by providing solutions for industrializing and accelerating in IoT system design and deployment, simplifying collaboration around them and improving their understandability, interoperability, openness and analysis.

SUMMARY

In one aspect of the present invention, methods and systems to abstract, model, simulate and continuously analyze global non-functional properties, such as profitability, availability, security and performance, of complex Internet of Things (IoT) systems are described. This modeling enables the collaborative design, interoperability, documentation, simulation, testing, deployment, operations, analysis and optimization of connected services and IoT infrastructures. Various embodiments of the present invention may be characterized as a tool for modeling an IoT system and controlling the evolution of this system. The present invention enables a customer or any entity to describe and simulate an IoT system in different scenarios and, in turn, derive various estimates for what the customer will have to invest. This is of great benefit to entities since building out and implementing a complex IoT system is likely an expensive and time and resource consuming endeavor.

Another aspect of the present invention is a method of modeling architecture, configuration, interdependencies and key performance indicators (KPIs) of an IoT system and its components in a grid of interlaced hierarchical dynamic graphs.

In the method and the system several functions are executed. These include: synthetizing the architecture design and configuration of an IoT system and its components and thereby easing its collaborative manipulation by IoT stakeholders. Other functions include the capture, visualization, storage, documenting, reusing of the architecture design and configuration of an IoT system and its components. In other embodiments the following functions may be executed: simulate and forecast the evolution of non-functional properties of the end-to-end system, or of any of its sub-systems, or its infrastructure or its applications; generate the code and configuration files of the underlying infrastructure that matches the high-level functional and non-functional properties requirements of a IoT system or of any of its sub-systems, or its infrastructure or its applications; compute the non-functional properties of an already deployed IoT system or/and of its components and compare them to the predicted non-functional properties of its simulated design and configuration; and generate recommendations and associated code and configuration files to remediate, change or optimize the design, deployment, configuration or operations of the global IoT system or of its sub-systems and their components.

BRIEF DESCRIPTION OF THE DRAWINGS

FIG. 13 is block diagram showing sequences of zones that can be used for modeling an IoT system in accordance with one embodiment;

FIG. 21 is an illustration showing relationships between the edge gateway and the "thing" in the information centric layer in accordance with one embodiment.

DETAILED DESCRIPTION

Figure 1:
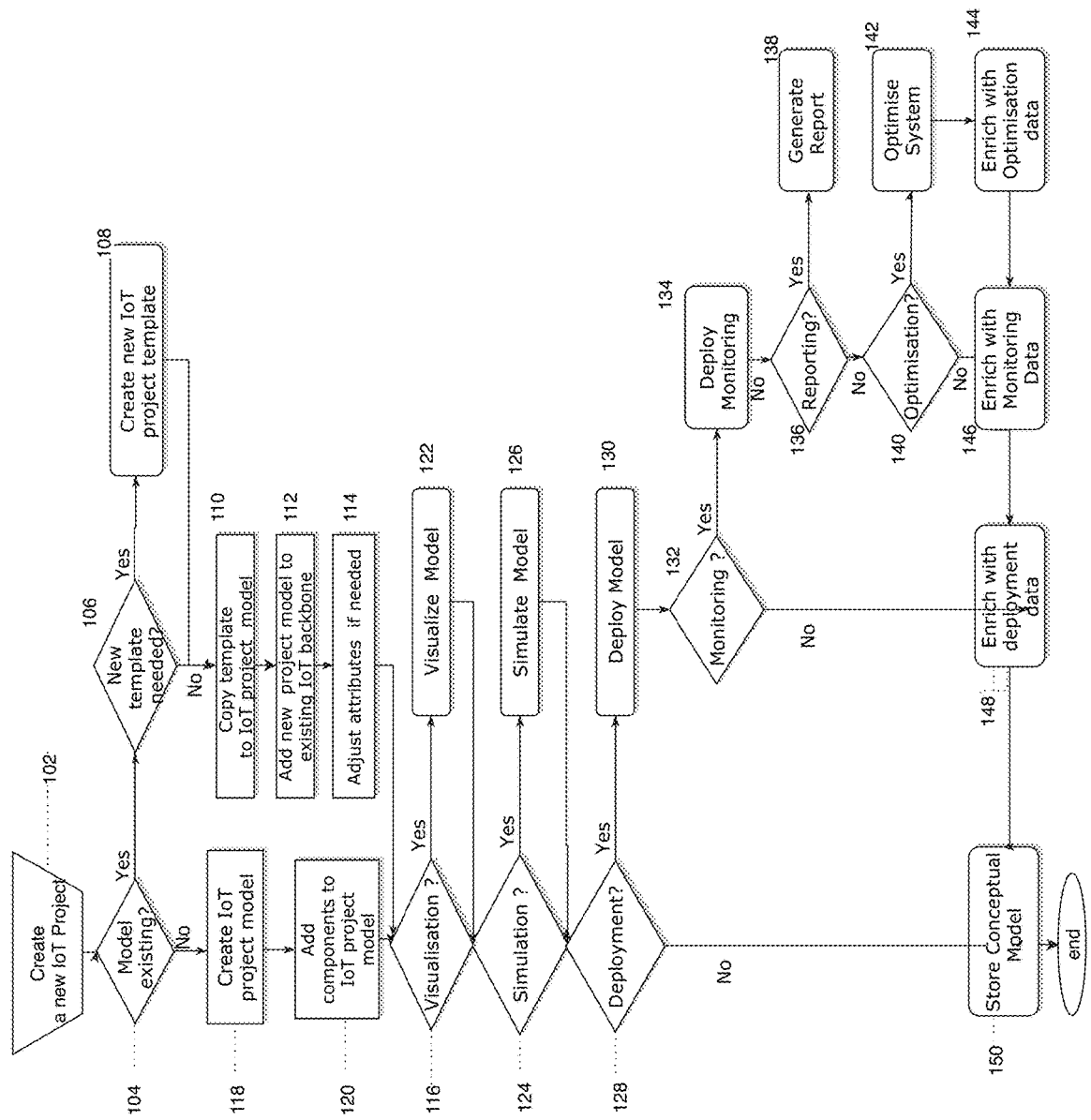
FIG. 1 is a flow diagram of a process of creating and integrating a new IoT project in accordance with one embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the described embodiments as defined by the appended claims.

In the following description, numerous specific details are set forth in order to provide a thorough understanding of the various embodiments. Particular example embodiments may be implemented without some or all of these specific details. In other instances, well known process operations have not been described in detail in order not to unnecessarily obscure the described embodiments. Various techniques and mechanisms will sometimes be described in singular form for clarity.

However, it should be noted that some embodiments include multiple iterations of a technique or multiple instantiations of a mechanism or technique unless noted otherwise. For example, a system uses a processor in a variety of contexts. However, it will be appreciated that a system can use multiple processors while remaining within the scope of the described embodiments unless otherwise noted. Furthermore, the techniques and mechanisms will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

One embodiment of the present invention is a method and apparatus to model, simulate and continuously analyze global non-functional properties such as profitability, availability, security and performance of complex Internet of Things (IoT) systems or networks. This modeling enables the collaborative design, interoperability, documentation, simulation, testing, deployment, operations, analysis and optimization of connected services and IoT infrastructures.

An IoT system is an organized interconnection of hardware and software components that enables global interconnectivity and data exchange between objects of the physical world, augmented by communication capabilities, referred to as IoT objects, and software applications and services which comprise IoT Services. These entities leverage connectivity and data processing capabilities to exploit sensing data and interact with IoT objects and users. In various embodiments, IoT objects or "Things" can be simple (sensors, monitors, software modules) or complex physical assets like vehicles, homes, planes, factories, human bodies, transportation infrastructures, energy infrastructures, and agricultural fields.

Various embodiments of the present invention may be characterized as a tool for modeling an IoT system and controlling the evolution of this system. In a simple example, there are two entities involved: the service provider who operates and manages the tool and the customer (also referred to as "user" herein), such as a large enterprise, who sells a service or product to end users or consumers. This is just one possible scenario. In another embodiment, the customer licenses the tool from the service provider and operates and uses it without the service provider's assistance.

The customer wants to offer a new service to its end users and offering this service requires a large IoT network or system. The customer has little experience or means of determining how this IoT system will work or how much it will cost, given that IoT networks can be complex, vast, and difficult to derive cost estimates. The company has a business goal, such as saving money on a service it already offers or perhaps offering a new or improved service to its end users. The business goal includes a return on investment (ROI) that it would like to get from the IoT system it is thinking of implementing. For example, it knows that it can charge x amount to its end users and that the ROI it wants is for example, 15%. Of course, there are other factors and values that come into the equation, but at a basic level, it knows that the IoT system needs to deliver at no more than a certain cost. Knowing this and values for other variables in the equation, the question is how much does the customer need to investment in building an IoT system to meet its business goals. In other words, given the equipment and software (collectively, infrastructure) it already has, the new infrastructure it will have to provide, the ROI it wants to achieve, and other factors, what will its IoT network look like and how much will it have to invest in it?

The methods and systems of the present invention (referred to as the IoT modeling "tool" herein for ease of explanation) enable a customer or any entity to describe and simulate an IoT system in different scenarios and, in turn, derive various estimates for what the customer will have to invest. This is of great benefit to entities since building out and implementing a complex IoT system is likely an expensive and time and resource consuming endeavor. The tool described below allows modeling and simulation of an IoT system and getting a clearer idea of what investment is required by the company before actual deployment of the system in a real, physical environment. The simulation enables controlling the evolution of the IoT system in a theoretical space, essentially allowing the customer to change scenarios and tune the IoT network to meet ROI goals, required expenditures and investments, and other factors until the IoT system meets the overall business goals of the company. Once the desired scenario is found, the company can implement it in a real environment, notably, with a much higher level of confidence and efficiency. In the embodiments below, methods are described for first deriving a passive model of the IoT system and then transitioning the passive model to an active model. An overview of design and development of a passive model is described below.

In one embodiment, the user of the IoT modeling tool (either the service provider on behalf of a customer or the customer itself) selects, among other things, pre-defined zones, also referred to as silos, templates, and structures. Examples of zones are provided below, such as "thing" zone, "edge" zone, "application" zone, and so on. The user may then define nodes in each zone. For example, a node may be a combination of hardware components or modules and software that is part of and contributes to the relevant IoT system. For example, in a connected vehicle context, the node would be the hardware and software in the car that enables it to communicate with other cars and things in the IoT network (the node would not generally not be the entire car itself). In addition, for each zone or silo, the user selects a node type, of which there are several kinds, such as network node to mention one, all of which are described below. This step and the process described generally here are illustrated in more detail below. The user may also select or identify what is referred to herein as one or more functional layers in each selected node. Also, as noted, pre-defined templates are selected that explain or describe the mobile communication that is needed between the nodes and other components of the IoT system.

The user may then associate and specify indicators that characterize properties (of the IoT system) that the customer will need to analyze. These indicators have values which the customer identifies as important with regard to business, technological, and architectural properties of the simulated IoT system. These are indicators that need to be computed or analyzed (an indicator being a value that characterizes a property of a node). Once this is done, the customer may perform a few other tasks, and a description of a passive model of the IoT system is complete.

Figure 4:
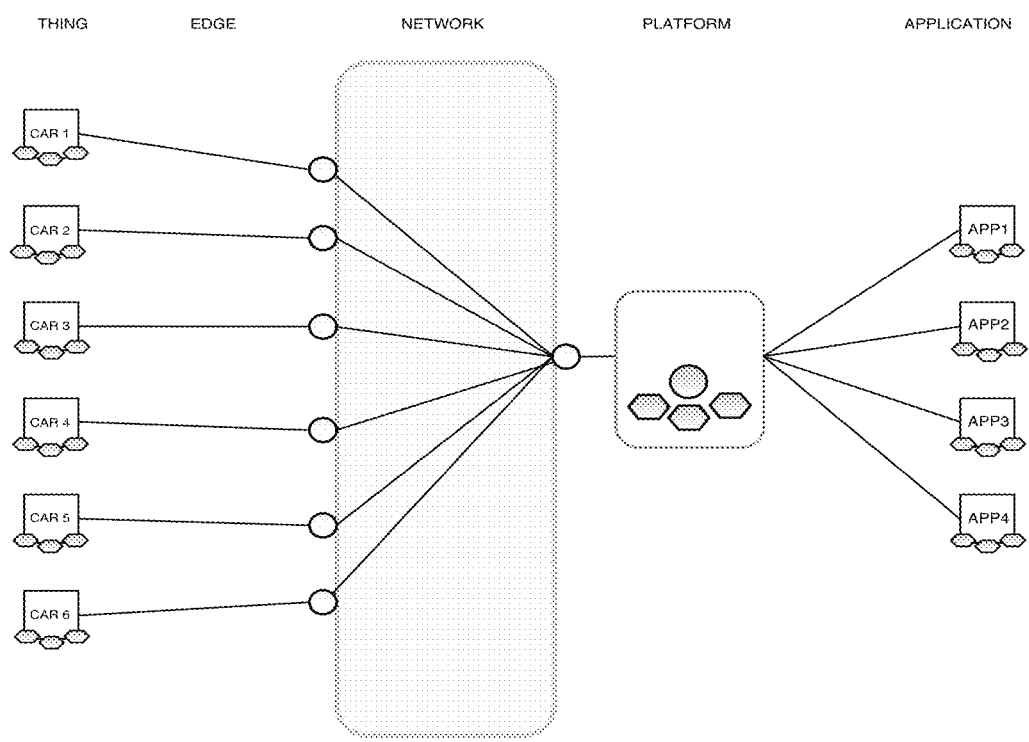
FIG. 4 is a graph diagram showing an example of an IoT system for connected vehicle use case in accordance with one embodiment.

Some indicators are critical or important to the IoT system and are referred to below as key performance indicators (KPIs) and, as noted, these and related formulas are pre-defined. The next stage of the process involves, in large part, using the KPIs and values to transition the passive model by simulating it and deriving an active model. An example of a passive model is shown in FIG. 4. Once there is a passive model, the simulation stage of the process can begin, more specifically, a simulator is associated with the passive model. As part of the active model stage, the customer creates or defines several simulation scenarios that allow it to describe an IoT system that will achieve its business goals.

Generally, the active model stage and executing the simulation scenarios involves, among other steps, collecting result data via probes and sensors which can vary widely depending on the nature and environment of the IoT system. Collecting results and tracking the evolution of indicators and KPIs enable analysis of properties that are important to the customer in achieving its business goals. In a simple example, in the connected vehicle environment, one scenario may have 100,000 cars on the road and the simulation allows the customer to see how well the cars can connect to the IoT network. It can verify if the system is able to handle this volume of cars or whether it can handle more cars, as well as adding other factors, such as time of day (e.g., rush hour, etc.) and over any specific period of time (day, weekly, monthly, etc) without degrading performance. As can be seen, there can be many different simulation scenarios involving many variables or factors, going beyond volume and temporal variables briefly noted here. Running these many and varied simulation scenarios in the active modeling stage enables collecting a vast repository of indicator values that can be analyzed to see if that specific configuration or model of the IoT system will enable the customer to reach its business goals.

Another component of the modeling and simulation tool is an agent. In short, an agent implements the code that modifies the attributes and properties of the passive model. An agent may read the activity of a node, for example, in a connected car, with respect to the IoT system. It simulates the car connectivity to the IoT system and communication of data to the cloud from the IoT system servers. The role of an agent is described in detail below.

Returning to the transition from the passive model to active model or simulation, it is helpful to summarize the process before providing a detailed, low-level view of the processes and constructs involved. First, a description of the passive model is finalized. As noted above and described in detail below, there are many steps, selections, and decisions that are made in the passive model stage of the present invention. A simulator, which may include a simulation scenario, is associated with the passive model. This simulation scenario is run or executed with the simulator. Data or indicator values are collected from probes, sensors, and any other instrumentation suitable for the IoT environment. These indicators are for properties and KPIs that the customer wants to analyze. At this stage, the process of activating a simulator is complete.

FIG. 1 is a flow diagram of a process for creating a new IoT system in accordance with one embodiment. The process starts at step 102 where the decision to create a new IoT system is made. At step 104 the user determines whether an IoT model exists. If a model does exist, control goes to step 106 where it is determined whether a new template is needed. If a new template is needed, control goes to step 108 where a new IoT project template is created. If a new template is not needed at step 106, control goes to step 110 where an existing template is copied to the IoT project model. Control then goes to step 112 where the new project model is added to an existing IoT backbone. At step 114 the attributes of the IoT project are adjusted if needed.

Going back to step 104, if there is not an existing model, control goes to step 118 where a new IoT model for the project is created. At step 120 the user adds components to the IoT model. At step 116 the user determines whether visualization of the model is needed. If it is needed, control goes to step 122 where the model is visualized. If visualization is not needed at step 116, control goes to step 124 where it is determined whether simulation is needed. Control also goes to step 124 after the model is visualized at step 122. If simulation is needed, control goes to step 126 where the model is simulated. If simulation is not needed, control goes to step 128 where deployment of the IoT model is determined. If it is, control goes to step 130 where the IoT model is deployed. If deployment is not needed, control goes to step 150 where the conceptual model is stored. At step 130, after a model is deployed, control goes to step 132 where the user determines whether monitoring is needed. If monitoring is needed, control goes to step 134 where monitoring is deployed. From step 134, the user is determines whether reporting is needed at step 136. If reporting is needed, control goes to step 138 where a report is generated. If reporting is not needed, step goes to step 140 where optimization is determined. If the IoT system needs optimization, control goes to step 142. The next step is step 144 where the IoT system is enriched with optimization data. Control then goes to step 146 where the system or model is enriched with monitoring data. Control also goes to step 146 from step 140 if optimization is not needed. Essentially, the model is not enriched with optimization data when control goes straight to step 146. From step 146 control goes to step 148 where the model is enriched with deployment data. Control also goes to step 148 from step 132 if monitoring of the IoT model is not needed. From step 148 control goes to step 150 where the conceptual model is saved. The conceptual model is also saved after step 128 if deployment of the model is not needed.

Figure 2:
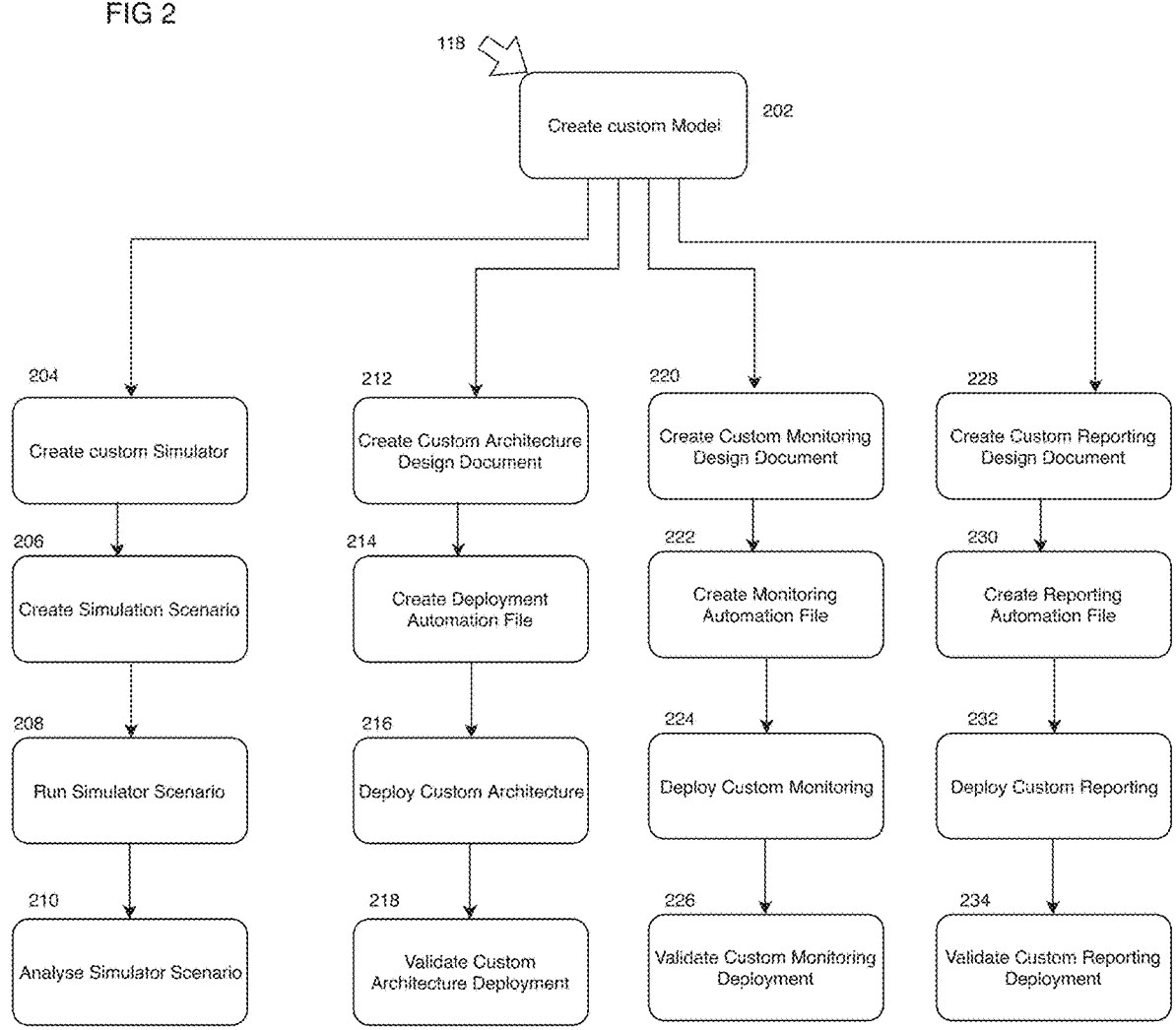
FIG. 2 is a flow diagram of a process of creating and using a custom model in accordance with one embodiment.

FIG. 2 is a flow diagram of a process of creating a custom IoT model in accordance with one embodiment. The process starts at step 202 where the custom model creation process starts. From there, four different high operations occur. At step 204 a custom simulator is created at step 204. A custom architecture design document is created at step 212. A custom monitoring design document is created at step 220 and at step 228 a custom reporting design document is created.

Following the flow from step 204, after a custom simulator is created, the user (or customer) created a simulation scenario at step 206. At step 208 the simulation scenario is executed or run on the simulator. At step 210 the data from the simulator scenario is analyzed. Following the flow from step 212, the user creates a deployment automation file step 214 and the custom architecture design from step 212 is deployed at step 216. At step 218 the custom architecture design is validated. Similarly, from step 220, a monitoring automation file is created at step 222 followed by deploying custom monitoring. The monitoring deployment is validated at step 226. After step 228, a reporting automation file is created at step 230. At step 232 the custom reporting is deployed and at step 234 the custom reporting deployment is validated.

Figure 3:
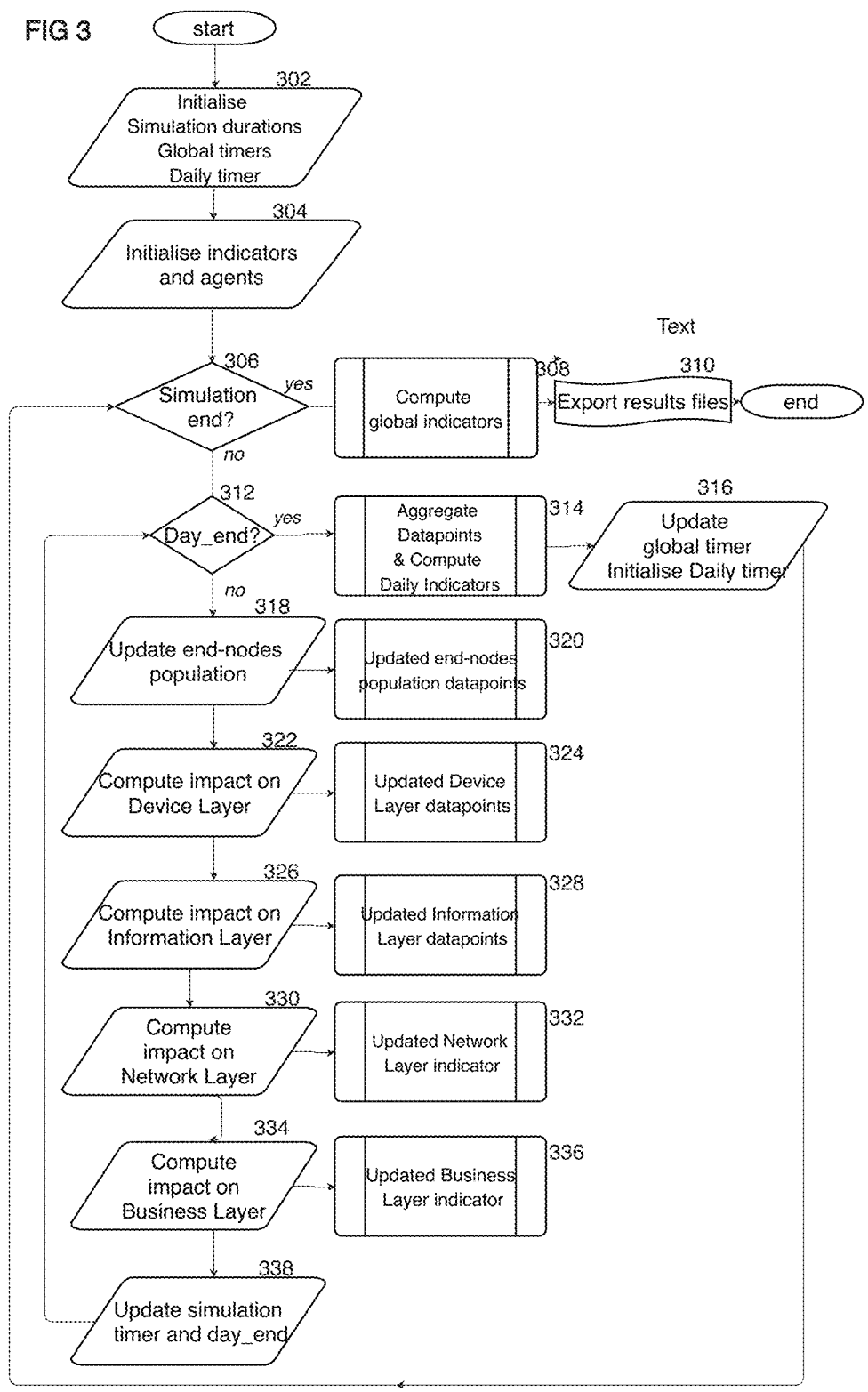
FIG. 3 is a flow diagram of a process showing the scheduler of a simulation of an IoT system in accordance with one embodiment.

FIG. 3 is a flow diagram of a process that illustrates a scheduler of a simulation of an IoT system with a time granularity of, in this embodiment, one minute. The simulation is driven by the evolution of the "thing" population which impacts the interdependent layers involved. In this embodiment, the daily pattern is adapted and reproduced up to the end of the simulation according to initialization parameters. At step 302 the system initializes simulation durations, including global timers and daily timers. At step 304 all indicators and agents (described below) are initialized and simulation begins. At step 306 the system determines whether the simulation has ended and if it has, control goes to step 308 where global indicators are computed. This outputs results files 310 which can be shared with the user and the simulation is complete.

Returning to step 306, if the simulation has not ended, control goes to step 312 where the system checks whether the day timer elapsed. If it has, control goes to step 314 where data points are aggregated and daily indicators are computed. The system then updates global timers and initializes the daily timer at step 316. The system then returns to step 306 where it checks if simulation has completed.

If the day timer has not elapsed at step 312, control goes to step 318 where end-node populations are updated. This results in updated end-node population data points as shown at 314. Following step 318, the system computes the impact on the device layer at step 322 which results in updated device layer data points as shown at 324. At step 326 the simulation's impact on the information layer is determined and the results are provided at 328. Following step 326 is step 330 where the impact on the network layer is computed and results in updated network layer indicators as shown at 332. The impact on the business layer is computed at step 334 resulting in updated business layer indicators as shown at 336. The final step, step 338 the simulation timers and day-end time are updated and control returns to step 312 where the system determines whether the day end parameter has been reached and the process continues as described above. Eventually, control will go to step 306 where it is determined whether the simulation has ended and if so, result files are exported and the process is complete.

Figure 5:
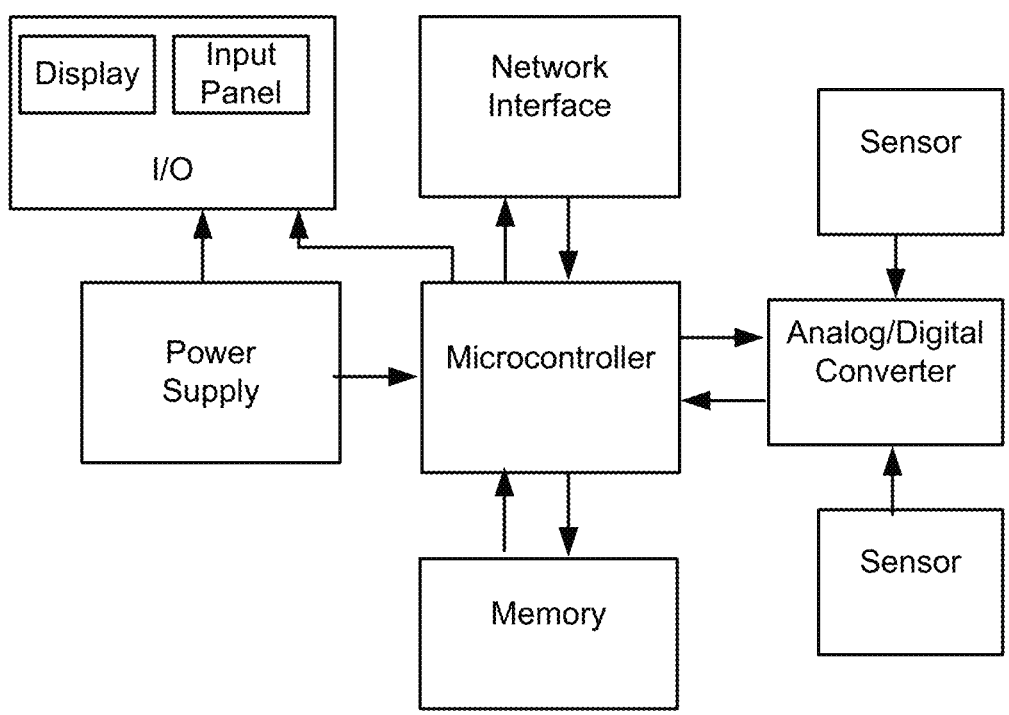
FIG. 5 is a block diagram of an IoT device in accordance with one embodiment.

The FIG. 4 illustrates an IoT system for connected cars. This diagram is a snapshot of the system at an instant: six cars are connected and they communicate to 4 active applications via an IoT network and an IoT platform. FIG. 5 shows a block diagram of a connected device associated with the cars. It can include Sensors, an A/D converter, a microcontroller, a memory, a network interface, a power supply, an Input/output (I/O). In this example, the I/O includes a display and an input panel. The input panel can include one or more input buttons, a touch screen and voice recognition software.

An IoT system enables heterogeneous objects interacting with the physical world to communicate and interoperate with remote software entities via various networks and application protocols. The resulting set of entities that are interconnected at a given time can be very dynamic and distributed. The continuous assessment of the cost, capacity, performance and security properties of the resulting system can be critical to justify its deployment and maintenance. But justifying such investment can be very complex and challenging when many heterogeneous pieces are assembled and different stakeholders involved.

Principles of Methods for Modeling an IoT System

The method can involve abstracting the complex IoT system composed of hundreds, thousands or millions of entities and their interactions in a grid of interlaced hierarchical dynamic graphs. Advantages of the abstraction can be:

- a reduction in the complexity of the dynamic system to study. The reduction in the complexity can include:
  - reducing the number of entities to manipulate by considering dynamic populations of entities rather than individual objects,
  - hiding the heterogeneity of components (hardware, software, protocols . . . ) by relying only on technology-agnostic attributes for defining the structure (topology) and adding technology-dependent attributes for characterizing technology specificities.
  - isolating and characterizing the critical dependencies and interactions (relationships) between groups of entities (populations) to propagate constraints automatically.
  - combining architectural, business and technical properties (Key performance indicators-KPIs) to characterize the system and its sub-system unequivocally with multi-criteria signatures.
  - Associating characteristics, dependencies and indicators to provide a consistent, end-to-end and holistic view of the system (systemic thinking).

Usage of the Systemic Modeling an IoT System

Figures 6, 7:
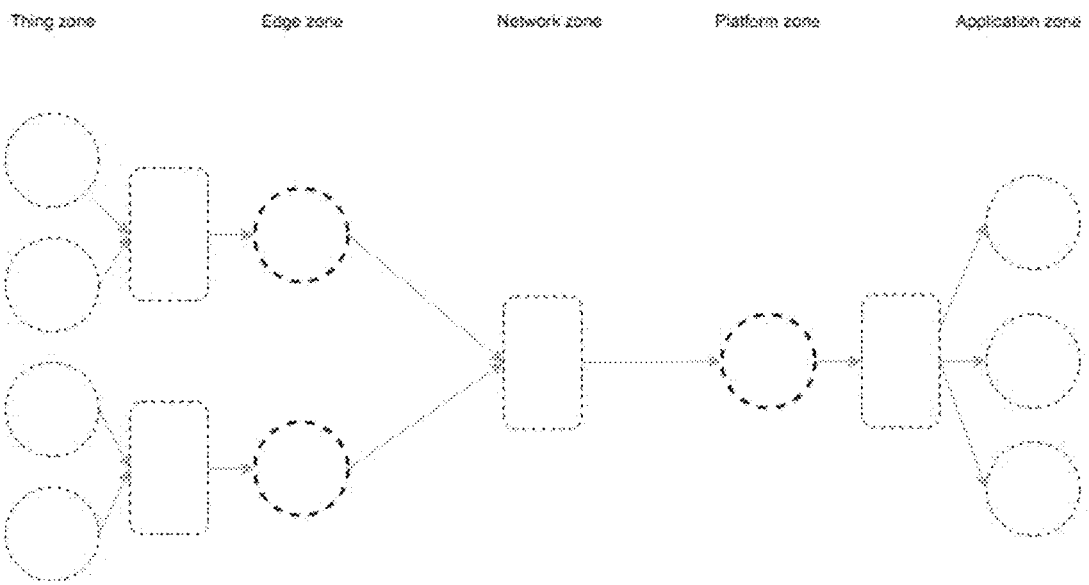
FIG. 6 is a user interface element of an IoT system dashboard in accordance with one embodiment.
FIG. 7 is an illustration of a mathematical model of an IoT system with five zones and one region in accordance with one embodiment.

This systemic modeling can enable:

- the simulation of many different types of IoT system architectures and deployments for joint business, technical ad architectural assessment,
- the rapid analysis of any IoT system (simulated or deployed) as a whole (end-to-end), by silos (zone), by geographical region (region) or by abstraction level (layer) consistently along the business, technical architectural dimensions. The rapid analysis can solve questions like:
  - analyse one deployment scenario zone per zone to localize contention or high cost zones.
  - compare Opex (operational expenditure) and Capex (capital expenditure) per zone and per layer, globally or over region.
  - compare capacity consumption ratio and absolute values between two zones like edge and platform for optimizing a fog computing scenario
  - analyze in detail cost and capacity consumption over time per month over years or for one typical day of a month,
- the comprehensive comparison of various architectures or various deployment technologies according their multi-criteria (business and technical) signatures as shown in FIG. 6.
  - compare different scenarios simultaneously on Business KPIs, Technical KPIs, Architectural KPIs under various workload,
- the efficient coding of the architecture and configuration to clone or scale globally IoT systems without minimal effort,
- collaborations around IoT systems within the enterprise teams and across industries.
- intuitive visualization and automatic documentation of the IoT system and its components, by zone or by layers.
- future-proof, evolution and optimization of an IoT system end-to-end, consistently and continuously,
- a common framework to accompany the full life cycle of the system and store all related scores and decisions.

1. Examples of usage during the different phases of the IoT system life cycle

Design—Early Stage

Design a simple end-to-end architecture to support several IoT service(s).

Simulate the cost of a simple end-to-end architecture

Simulate the ROI of an IoT project with a simple end-to-end architecture

Document a simple end-to-end architecture design for a new IoT service(s).

Deployment—Production Stage

Make technology and configuration chokes for each sub-layer of an end-to-end architecture Simulate the evolution of capacity with different growth pattern per sub-layer or end-to-end Compare configuration and messaging patterns under cost constraints per sub-layer or end-to-end Document and report the detailed end-to-end architecture components and deployment decisions Optimization—Growth Stage Find and analyze the bottleneck of a deployed architecture Evaluate the impact of a change of a layer in a deployed system Simulate and validate the detailed behavior of a specific component under different constraints.

Document and archive the detailed decision made on an end-to-end system.

The same method and apparatus can be used to assess the end-to-end security of the complex interconnection of IoT devices (Things), IoT gateways, IoT networks, IoT data brokers, IoT applications and end-users composing an IoT system. In addition, the same method and apparatus is proposed to improve the interoperability and collaboration around IoT systems.

Details of an IoT System

The proposed model can be articulated around at three main concepts:

1) Structure: Identify and organize the IoT entities in zones, regions and layers (KC: key characteristics)
2) Relations: Couple entities or components within and across zones, regions and layers (KRL: key relationships)
3) Indicators: Associate indicators reflecting key properties of the IoT system and its entities or components (zones, regions and layers) (KPI: key performance indicators).

The above modeling creates the "DNA" of an IoT system which is core to the creation of the digital "twin" of a physical system: a structure (model) that carries the "genetic instructions" (specifications defined by the genitors of the system) used in the design, growth, development, functioning and reproduction of an IoT system. The model stores the key architecture information (components and relations) and system performance indicators (past) and system prognosticators (future) standards.

Figure 11:
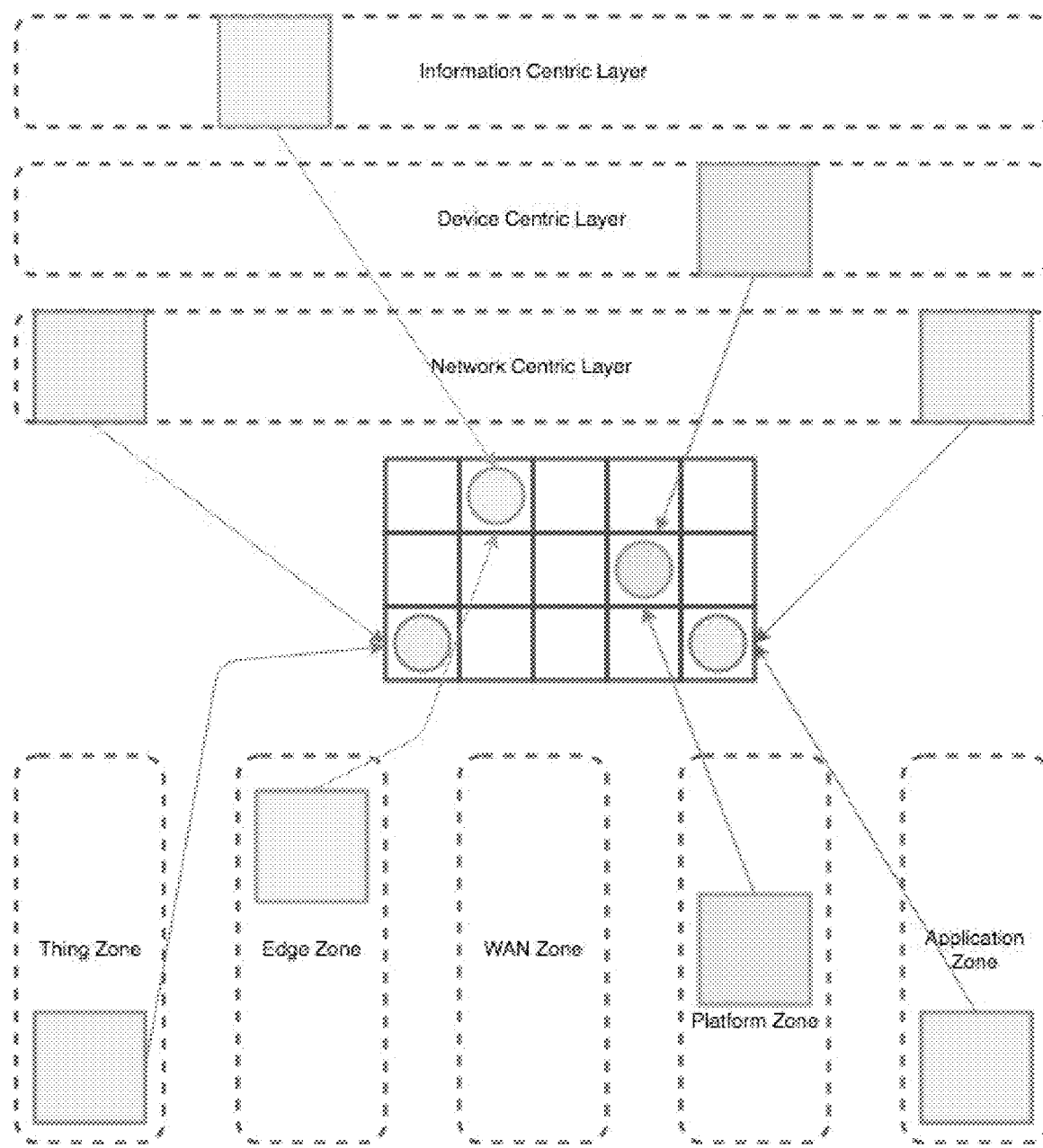
FIG. 11 is an illustration of a grid model combining zones and layers to compose a grid in accordance with one embodiment.
Figure 12:
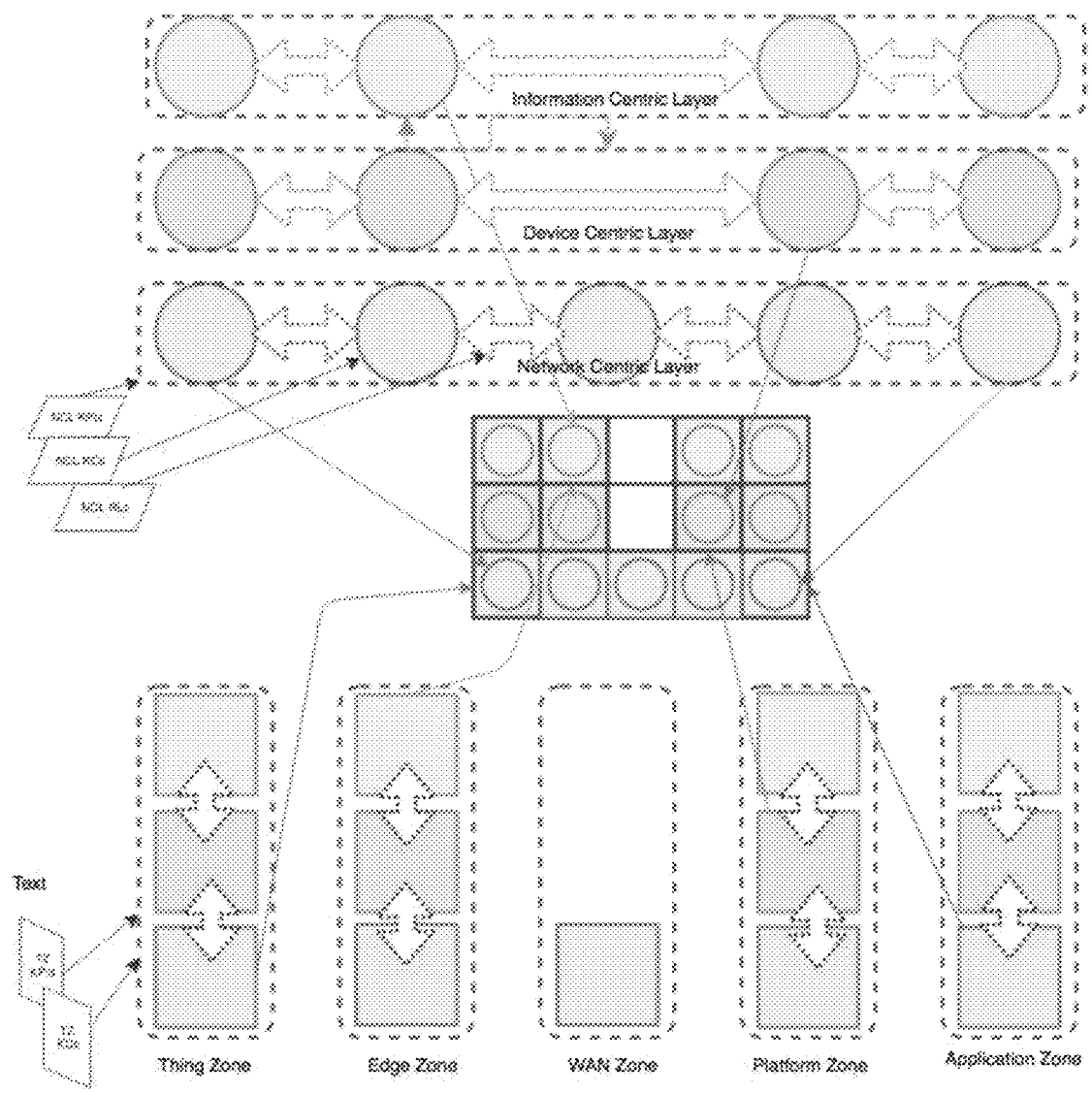
FIG. 12 is an illustration of a grid model combining layers and zones with respective key characteristics, key relationships, and key performance indicators in accordance with one embodiment.

In one embodiment, the IoT system can be mathematically defined as a grid of interlaced hierarchical graphs. This way, the IoT system can be decomposed into:

vertically in interconnected zones horizontally in interconnected layers transversally in interconnected regions zones and layers are mutually associated to compose the grid as depicted in FIG. 11. A third dimension, representing geographical regions, can be added when the system is very large.

Figure 8:
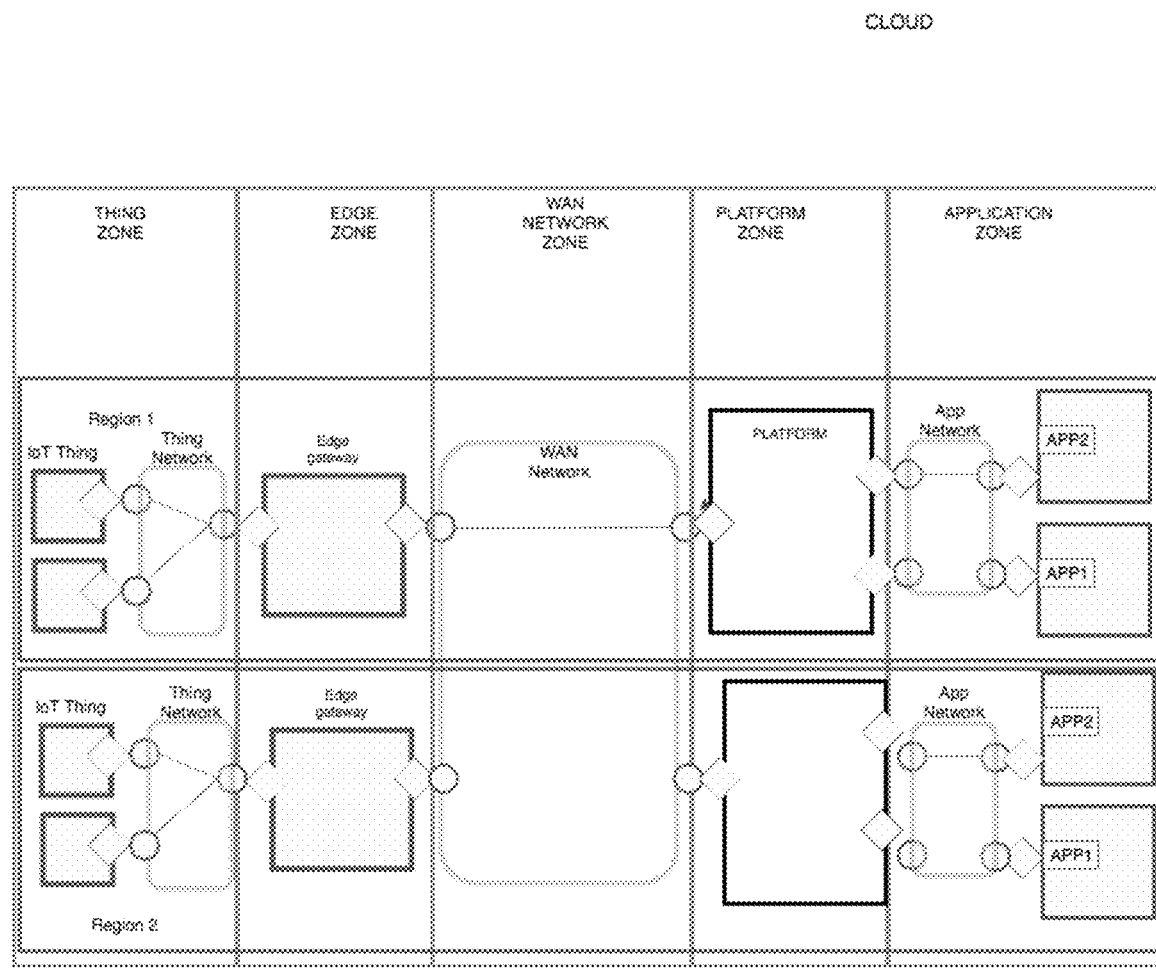
FIG. 8 is an illustration of an expanded model with two regions and five main zones in an IoT system in accordance with one embodiment.

FIG. 8 illustrates the mathematical model of an IoT system with five zones and one region according to the method described below.

One Example Definition of an IoT Zone

An IoT system is deployed in the real world and can be expanded to the virtual world and the cloud. To reflect this dual nature, the graph of the IoT system can be segmented in zones that correspond to the different conceptual areas of the physical-virtual (cyberphysical) system according its conceptual distance from the physical world. An IoT zone can be a subset of the IoT system comprising interconnections of hardware and software components within a defined area of the end-to-end chain between the IoT object and the IoT Application.

As illustrated in FIG. 7, the modeling method distinguishes five main zones in an IoT System that are grouped in two types of zones: end zones or core zones. IoT entities can be of two types: nodes and hubs. In one instance, any zone can have at least a node or a network (considered as a hub).

End zones:
    a. IoT Thing zone (TZ)
    b. IoT Application zone (AZ).
Core zones:
    a. IoT Edge zone (EZ),
    b. IoT Wide Area Network (WAN) zone (NZ),
    c. IoT Platform (PZ) zone.

End Zones:

IoT Thing zone (TZ): The IoT Thing zone corresponds to the area in direct interaction with the physical world. The physical Things are generating the raw IoT data from sensors listening to the environment or the thing itself. Things are also responsible for executing actions towards the real environment. The actions are ordered by remote applications, which represent organs of decision. The Thing Network couples this zone with the adjacent zone. The number of Things can be large and evolving rapidly. A simulation will consider the evolution of the population of Things to analyze the business and technical KPIs of an IoT system.

The IoT Application (AZ): The IoT Application zone is the entity executing the business logic that exploits the data produced by things or generating remote commands to control connected things. The IoT Application back-end is located close to the IoT platform or to the Edge while the front-end can be a desktop app of remote operators or a mobile app on a user located close to the connected "thing". The number of Application (front-end and back-end instances) can be large and can evolve rapidly with the number of connected things. A simulation can consider the dynamic of the Applications population to analyze the impact of Application-level decisions on the IoT system KPIs. The Application Network couples this zone with the adjacent zone.

Core Zones:

IoT Edge zone (EZ): The IoT Edge zone corresponds to the area between the physical things and the long distance IoT Network area. An IoT Edge is augmenting the IoT Things with protocol adaptation, data filtering, data collection and pre-processing and Internet connectivity capabilities. With respect to this augmentation of the IoT Things zone, in FIG. 21, the focus is on the information layer relationships established in the real world example of connected vehicles. More generally, FIG. 21 illustrates the relationships between the edge gateway and the thing in the information centric layer. This shows how the edge gateway can subscribe to a topic of a thing (e.g., a car) to aggregate the series of samples (temporal aggregation) and republish the result as a new topic that can be consumed locally or remotely. In this manner, the gateway can also aggregate the same topic of a set of cars and republish the result. This may be referred to as spatial aggregation. The consequence is the decrease in upstream network traffic.

Returning to the IoT Edge zone (EZ), it helps in increasing security, performance, privacy and decreasing bandwidth requirements from the Wide Area Network and processing needs in the Things zone and in the centralized platform. A simulation can consider the distribution of computation across edge hubs to analyze the impact of architecture decisions (edge computing, fog computing) on the IoT system KPIs. The Edge Network couples this zone with the adjacent zone.

The IoT Wide Area Network (NZ): The IoT WAN is located between the IoT edge and IoT platform area and is in charge the transport of IoT data over long distance and via Internet liaisons to centralized data centers or Cloud platforms. IoT wide are networks are very diverse and can leverage new transport technology like 5G or low power radio like LPWAN. Today the NZ is essentially composed of a wide area network. In the future this zone will integrate processing and storage functions, as the model already enables. A simulation can help analyzing the impact of Network technology decisions on the IoT system KPIs, but also the benefits of in-network processing.

The IoT Platform (PZ): The IoT Platform zone is located between the IoT Network area and the IoT Applications and is providing connection aggregation, security functions, data management functions like data exchange, processing and storage. A simulation can help analyzing the impact of Platform technology and architecture decisions on the IoT system KPIs.

Flexible and Pre-Defined Composition of Zones to Form an IoT System:

In one embodiment, the different zones can be assembled and linked in a pre-defined way to compose IoT systems. In the general definition of an IoT system the simplest IoT system will contain only end zones: Thing zone and Application zone.

A wide IoT system contains a wide area network: an IoT WAN zone is inserted between the IoT Thing zone and the IoT Application zone. An optional IoT Platform zone is inserted between the IoT WAN and the IoT Application zone to create an intelligent IoT system. IoT Edge zone enables distribution of the function of the IoT platform and making the system more efficient and smarter.

With the modeling method, an IoT system can be composed by following one of the sequences as shown in FIG. 13:

TZ.AZ: smart thing with embedded application
TZ.EZ.AZ: connected thing with local application
TZ.NZ.AZ: Internet of Things with remote application
TZ.NZ.PZ.AZ: Internet of Things with centralized data platform
TZ.EZ.NZ.PZ.AZ: Internet of Things with distributed data platform (fog computing)

Components of an IoT Zone

Definition of the Nodes and Sub-Networks of an IoT Zone

The basic components of an IoT zone are named nodes and sub-networks. A node is the combination of hardware or software entities that implement layer slices, which contribute to the delivery of the functionalities of an IoT sub-system. Nodes are typed. Leaf nodes (for thing and application zones) and core nodes (for edge, WAN network and platform zones) can be distinguished as shown in FIG. 8.

IoT nodes can represent clusters of hardware devices or software components organized in micro-services. This enables to leverage the model when scaling an IoT system out. Nodes can be interconnected with each other via sub-networks. They are connected to the sub-network via Network Access Points. Sub-networks can be of any technology. The technology can be abstracted in attributes like max number of Network Access Point, bisection bandwidth, coverage.

Definition of the Region of an IoT System or of a Zone

Figure 9:
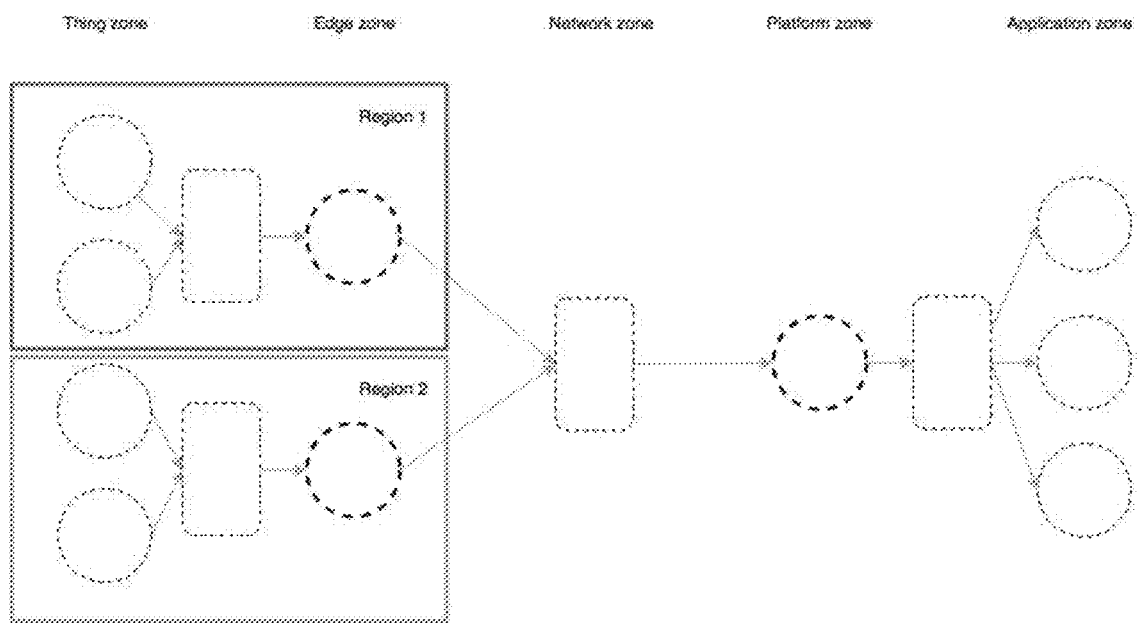
FIG. 9 is an illustration of a mathematical model with regions and zones in accordance with one embodiment.

A region is a grouping of nodes and sub-networks in a geo-located area defined by its central position (GPS coordinate), time zone and coverage. Regions can be interconnected or not. A region can be local to a zone, a set of zones or can span the end-to-end IoT system as depicted in FIG. 8. In FIG. 9, two region segment Things and Edges zones. The Network and centralized platform are not associated to a specific region. This means that they can potentially have a global (worldwide) coverage.

Definition of Layers of an IoT System

Figure 10:
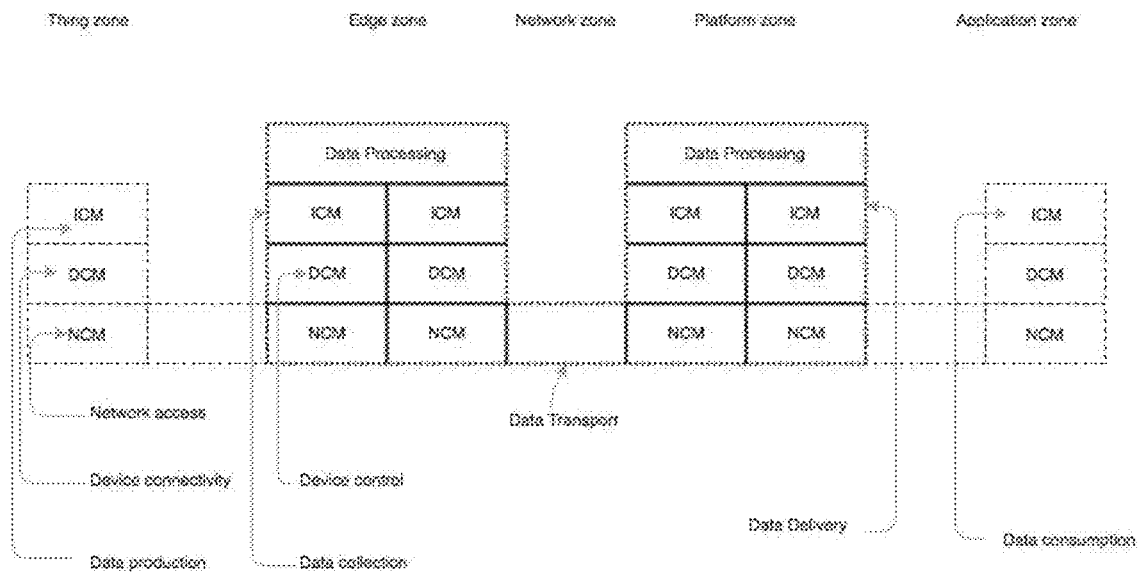
FIG. 10 is an illustration of an orthogonal model of an IoT system with three layers implementing end-to-end IoT functionalities in accordance with one embodiment.

The IoT system is decomposed in interdependent functional layers that are implemented in a distributed manner a set of IoT functionalities like:
Network access
Device connectivity
Device management
Device control
Data production
Data consumption
Data collection
Data transport
Data processing
Data storing
Data delivery FIG. 10 illustrates the orthogonal model (layered interconnected graphs) of the previous IoT system with 3 layers implementing end-to-end IoT functionalities. The three layers that are considered here are:
1) ICM: Information-Centric Layer
2) DCM: Device-Centric Layer
3) NCM: Network-Centric Layer.

Figure 16:
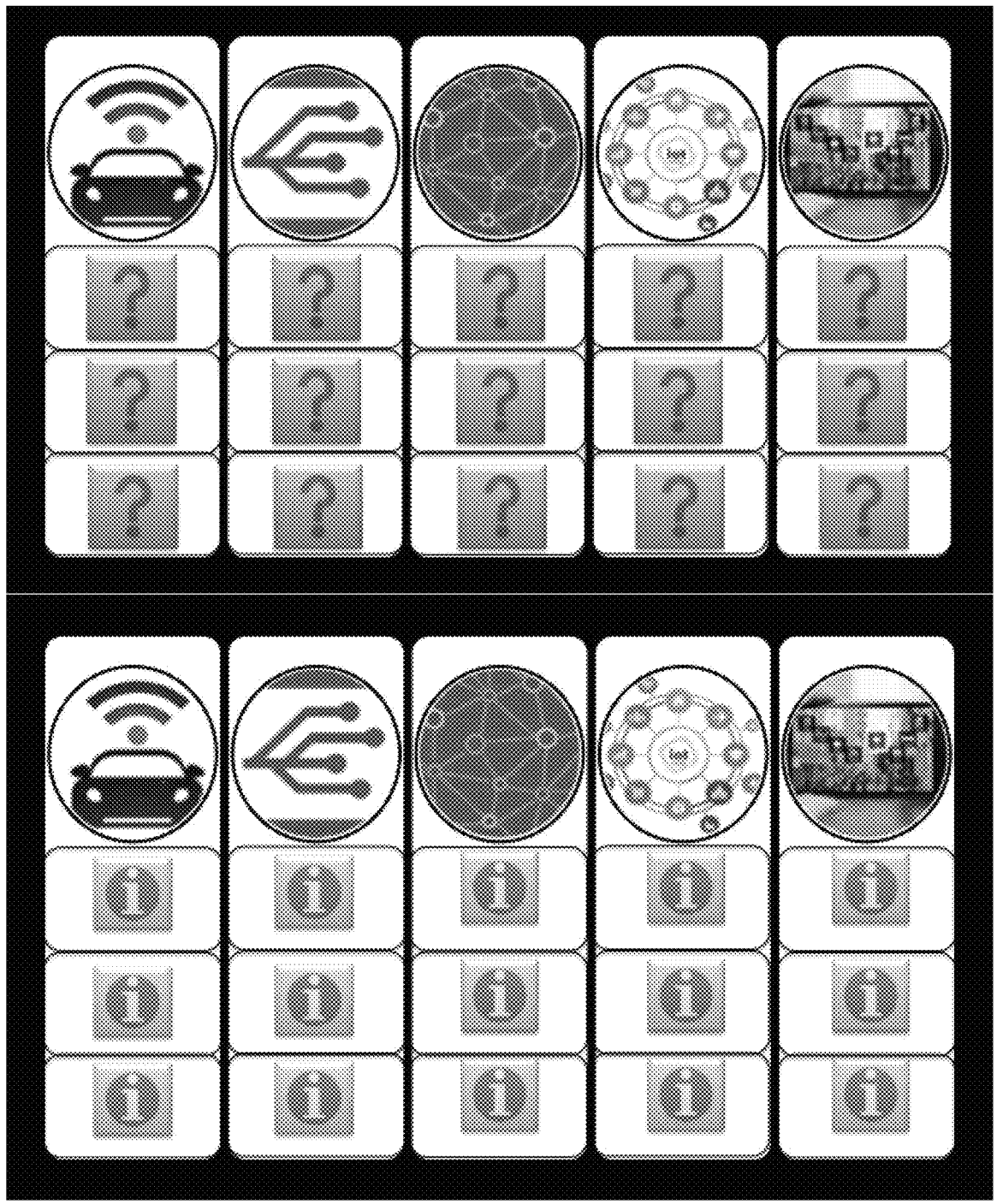
FIG. 16 is a diagram showing four functional layers in accordance with one embodiment.

Layers depict the abstract functional levels under study. For example, in FIG. 16, four functional layers are considered: Hardware layer (energy, compute, storage power supply layer) Networking layer, Connectivity Layer and Data layer.

Hardware layer: comprising energy, compute and storage power supplying equipment
Network-centric or Networking layer comprising and interconnecting network access points and network hubs
Device-centric or Connectivity layer comprising and interconnecting connection end-points and connections hubs
Information-centric or Data Layer focusing on Data collection/processing/storage/delivery: comprising and interconnecting Topics, Subscribers and Publishers and Data Hubs.

Figure 14:
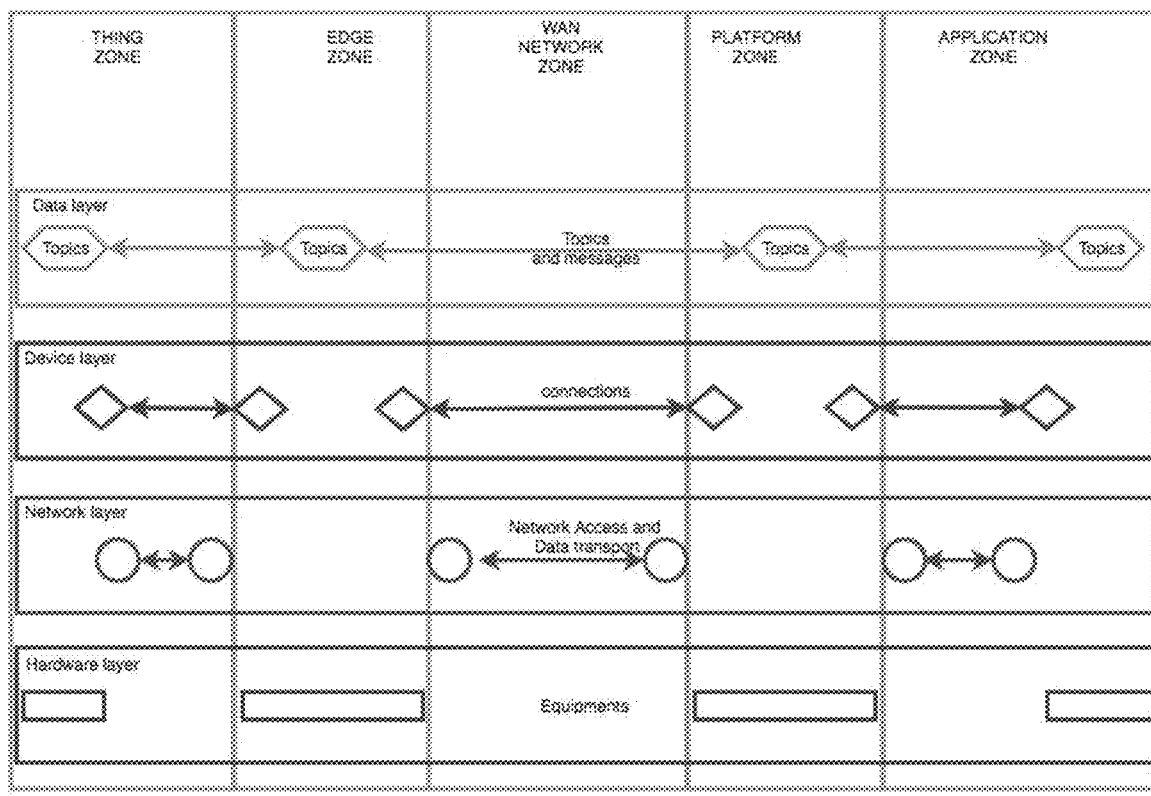
FIG. 14 is an illustration showing intra-layer couplings of five zones and four layers in accordance with one embodiment.

The layers are horizontally distributed within nodes and sub-networks participating in the IoT system. The layer slices of each nodes are in a relationship outside the node with similar slices in other nodes. This enables grouping them as independent IoT system functions in technical layers like: Hardware-Centric layer, Network-centric layer, Device-centric layer, Information-centric layer as shown in FIG. 14.

Hardware-Centric Layer
Energy supply required to ensure networking, connectivity and data processing
Computing power supply required to ensure networking, connectivity and data processing
Storage and Memory supply required to ensure networking, connectivity and data processing
Local security mechanisms required to ensure local equipment protection.
Network-Centric Layer
Communication
Data transmission and reception
Data transport
Network and data transport security
Device-Centric Layer
Identification
Authentication
Secure channel establishment
Connectivity management
Connectivity security
Information-Centric Layer
Data collection
Data processing
Data storing
Data delivery
Data consumption
Data protection Each IoT node instantiates locally one, two, three or four of the technical layers. In one instance, The Hardware-Centric layer and Network-Centric layer can be mandatory to be part of an "Internet of Thing system" but are not necessarily studied. The Information-Centric layer cannot be implemented without the Device-Centric layer Additional layers for modeling security or interoperability aspects can be added.

The number of functional layer entities that can be stacked varies according the user needs in terms of modeling. In each node, the layers slices are stacked according the principal function of the zone. For example, if the WAN zone is just transporting data, Device and Information layers will be nonexistent as shown in FIG. 8. In this case the Wide Area Network zone implements only the hardware and networking layers Definition of the Non-Functional Properties of an IoT System Associated with its four key technical functionalities, the IoT system and its components are characterized by its non-functional properties that are grouped in business, technical and architectural properties. In one embodiment, these non-functional properties can be local to a zone, a region or a layer as well as global and end-to-end (from the Thing end zone to the Application end zone).

Business Properties:
Cost (BP-C)
Revenue (BP-R)
Profitability (Return on Investment "ROI")) (BP-P)
Time-to-market (BP-T)
Sustainability (BP-S)
Technical Properties:
Capacity (TP-C)
Performance (TP-P)
Reliability (TP-R)
Availability (TP-A)
Security ((TP-S)
Architectural Properties
Complexity (AP-C)
Aggregation level (AP-A)
Distribution level (AP-D)

Scalability (AP-S)
Interoperability (AP-I)
Flexibility (AP-F)

The table below summarizes examples of these properties. The set of KPIs can be extended:

| Business properties | Business KPI | Technical properties | Technical KPI | Architectural properties | Architectural KPI |
|---|---|---|---|---|---|
| Cost | BP-C | Capacity | TP-C | Complexity | AP-C |
| Revenue | BP-R | Reliability | TP-R | Aggregation | AP-A |
| Profitability | BP-P | Performance | TP-P | Distribution | AP-D |
| TTM | BP-T | Availability | TP-A | Scalability | AP-S |
| Sustainability | BP-S | Security | TP-S | Interoperability | AP-I |
| | | | | Flexibility | AP-F |

Definition of the Non-Functional End-to-End Properties of an IoT Zone

The non-functional properties of an IoT system are derived from the linear composition of the non-functional properties of its zones.

For example the BP-C (Cost of) the IoT System (X) can be defined as:

$$BP\text{-}C(IoT\ System(X)) = BP\text{-}C(TZ(X)) + BP\text{-}C(EZ(X)) + BP\text{-}C(NZ(X)) + BP\text{-}C(PZ(X)) + BP\text{-}C(AZ(X)).$$

The properties can be defined as follows, and corresponding mathematical formulation can be associated with them.

Business Properties:

Cost: the cost of an IoT zone is the aggregated opex and capex cost of the components deployed or/and the services subscribed to provide the IoT functionality of the IoT zone a a given IoT system.

Revenue: aggregated revenue generated by the zone functionalities sold to other IoT zones, to the environment or to end users.

Profitability: the profitability of an IoT zone is the Revenue of the IoT zone over the Cost of the IoT zone expressed in percentage.

Time-to-market: the Time to market of an IoT zone is the number of months required to deliver and interconnect the IoT zone expressed in month.

Sustainability: the sustainability of an IoT zone is the ability to maintain the system working and to sustain the profitability indefinitely. It is expressed as a Boolean. It can be computed as follows:

$$BP\text{-}S = (BPP > 0) AND (TP\text{-}C > 0) \text{ for any time } t \text{ after break-even point.}$$

Technical Properties:

Capacity: amount of units of functionality that can be delivered by the sub-system. The capacity of the global system is the combination of the capacity of all of its layers: hardware, networking, connectivity, data delivery, processing and storage.

Performance: Performance or Quality of Service (QoS): performance IoT sub-system in terms of latency or delay for delivering its functionalities. In general, the performance is the delay taken by a component between the reception of request and the delivery of the functionality. When the IoT system is up and running any active and authorized entity should be able to communicate and interact with any other active and authorized entity in an acceptable or assured or quantifiable response time according the quality of Service level required.

Reliability probability of delivering the functionality without fault. The reliability of the global system is the combination of the reliability of all of its layers-hardware, networking, connectivity, data delivery, processing and storage Availability: probability of delivering the functionality without disruption. The availability of the global system is the combination of the availability of all of its layers-hardware, networking, connectivity, data delivery, processing and storage Security: capability of protecting the system from any type of attacks and of controlling effectively the access to the system for delivering the functionality. The security of the global system is the combination of the security of all of its layers: hardware, networking, connectivity, data delivery, processing and storage.

Architectural Properties

Complexity: The complexity of an IoT system architecture is derived from the product of the distribution level, interoperability and flexibility of the architecture. For example the AP-C (Complexity of) the IoT System (X) is defined as:

$$AP\text{-}C(IoT\ System\ (X)) = (1 + Distribution\ Level) * Interoperability\ level * Flexibility\ Level.$$

For example, a system with edges and central platform is more complex than a system with central platform only. A system with two different platforms is more complex than a system with two similar platforms.

Aggregation level: The Aggregation level of an IoT system architecture corresponds to the max Number of Leaf nodes connected to a Core Node.

Distribution level: The Distribution level of an IoT system architecture is number of its core zones implementing the data layer. This can be 0, 1, 2, 3.

Scalability: The Scalability of an IoT system architecture is the Max number of supported Things Nodes.

Interoperability: The Interoperability of an IoT sub-system is 1 if the technology model of a sub-system can be changed by an other technology model, 0 otherwise. The Interoperability of an IoT system is the sum of the interoperability of its sub-systems.

Flexibility: The Flexibility level of an IoT system architecture is 1 if it can only support 1 architecture model, 2 otherwise.

Modeling Definitions

Definition of an IoT Infrastructure

An IoT infrastructure can be the complex underlying interconnection of IT hardware and software enabling IoT applications and services.

The IoT infrastructure can correspond to the core zones of the IoT system. It can comprise an Edge zone, a WAN zone and a Platform zone.

Definition of an IoT Infrastructure Architecture

The architecture of an IoT Infrastructure can be the organization of an IoT infrastructure in zones, regions and layers and their relationships (physical and virtual topology).

Definition of an IoT Infrastructure Architecture Design
  The design of the architecture of an IoT Infrastructure can be the encoded representation of the organization of an IoT infrastructure in zones, regions and layers and their relations (mathematical representation of the hierarchical graph).
  The mathematical representation can enable humans to understand and manipulate the organization univocally, to store, reuse, and exchange the design or part of it.
  The mathematical representation can enable a machine to understand and manipulate automatically the organization, compute key indicators and generate code to deploy its software components automatically.
Definition of an IoT Infrastructure Architecture Visual Design
  The design of the architecture of an IoT Infrastructure can be the visual representation of the organization of an IoT infrastructure in zones, regions and layers and their relations (visual representation of the hierarchical graph). This and the two point below are also shown in FIG. 11
  The visual representation can be performed by a machine able to understand the mathematical representation of the organization, the key indicators and generate the images of the IoT system model to display them automatically.
  The visual representation can enable humans to understand the structure and relationships of the system univocally and to analyze it.
Definition of the Configuration of any IoT System with its Sub-Systems and their Components.
  The configuration of an IoT system can be the setting of the values of the attributes of nodes and sub-networks. While the architecture captures the organization, the configuration quantifies the composing elements and their cardinality as well as defines the limits of the elements (max number of supported connections for a connection hub, max bandwidth supported for a network link).
Methods:
Method to Model an IoT System and an IoT Infrastructure Architecture
  The scientific modeling method can include:
  a) the systematic and structured inventory of the elements composing an IoT system according the model of zones, regions, layers, nodes and sub-networks defined above.
  b) the systematic and structured definition of the configuration of the components of zones, regions, layers, nodes and sub-networks as defined above.
  c) the systematic and structured definition of the relationships between the components of zones, regions, layers, nodes and sub-networks as defined above.
  d) The definition of the standard key indicators associated with the IoT system and its components.
Method to Capture the Design and Configuration of an IoT Infrastructure Architecture
  The method can include serializing the process of defining the structured organization of the inventory of the IoT system entities and the identification of their components and grouping as well as their relationships. The process enables an apparatus to automatically record the inputs of a user in a graph structure in memory for immediate exploitation (like simulation) or to learn it from existing configuration or monitoring files with machine learning tools (e.g., classification, pattern recognition, and the like).

Figure 18:
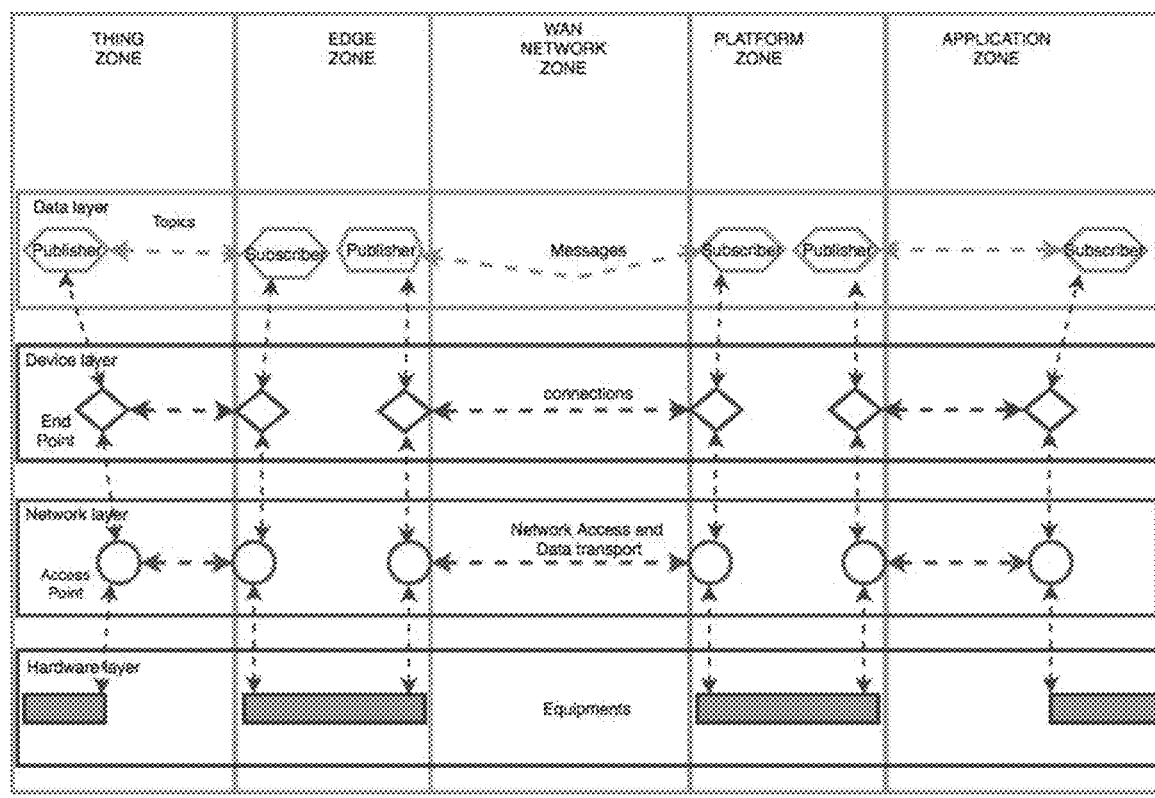
FIG. 18 is a global view of the core agent-based conceptual model defined for the capacity analysis of an IoT system accordance with one embodiment.
Figure 19:
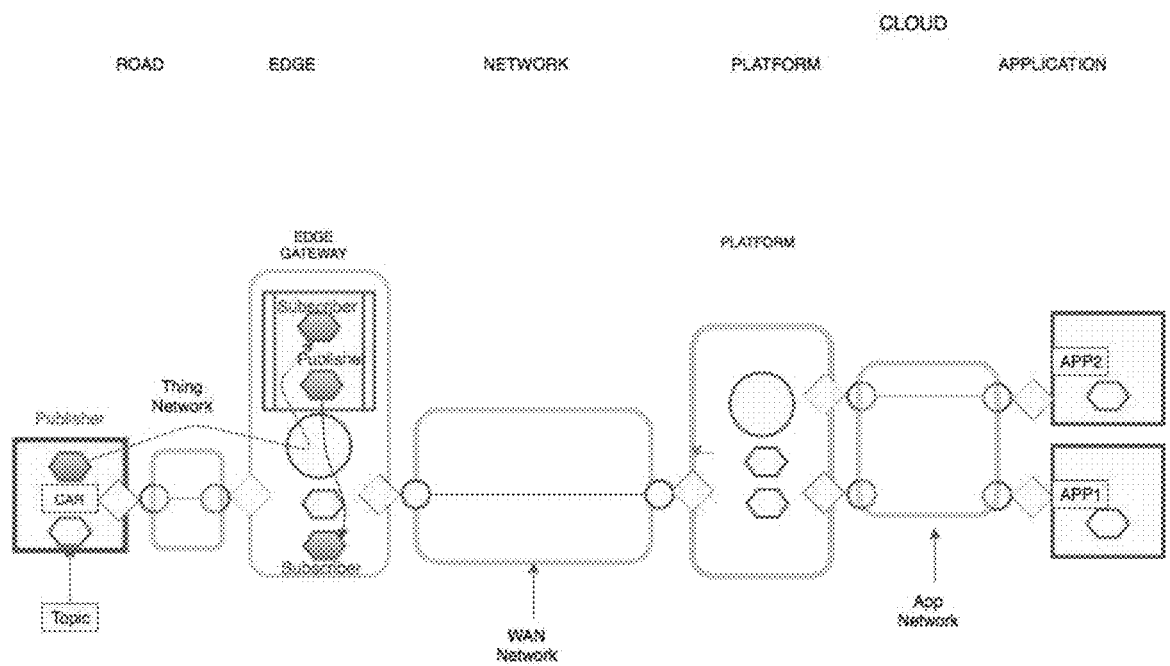
FIG. 19 shows the information layer relationships established in the real world example of connected vehicles in accordance with one embodiment.

FIG. 18 gives a global view of the core agent-based conceptual model defined for the capacity analysis of an IoT system. In the hierarchical graph of FIG. 18, the different layers and different tiers (or zones) defined are organized and inter-related. The horizontal relationships are also captured. To run a simulation, the user has to instantiate agents based on the agent types defined in this graph and then initialize them. The relationships will automatically be established. During the simulation, cascading effects can result in these underlying linkages and can also lead to emergent behavior. In operations, the global conceptual model, capturing the structural dependencies, and is used for root-cause analysis and to understand unexpected events. This is also described in FIG. 18 and FIG. 19.

Before describing other methods relating to IoT infrastructure and other facets of the invention, a description of agents is provided. An agent-based modelling approach is leveraged and adapted to intelligent connectivity and IoT to address systems the scale and heterogeneity of IoT systems.

The model is used to simulate the actions and interactions of autonomous agents (both individual and collective entities such as organizations or groups) with a view to assessing their effects on the IoT system as a whole. The goal is to search for explanatory insight into the collective behavior of agents obeying simple rules, by simulating the simultaneous operations and interactions of multiple agents to predict the appearance of complex phenomena. A common feature of complex systems is the presence of a non-linear threshold or critical parameter. The simulation can identify these parameters, which can then be monitored and controlled in real systems to avoid critical situations.

Simple decision-making rules, which encode behavior and bounded rationality, are associated to the individual entities defined in the model. In one embodiment, the entities may also exhibit "learning" behavior by exploiting monitoring data of the real system, adaptation such as auto-scaling or reproduction (cloning) when critical situation (saturation, failures . . . ) occur. The autonomous entities interact according a graph of relationships defined systematically with our modelling method.

The overall model is made actionable in part because of the following properties: numerous agents specified at various scales (individual, groups, tiers, regions) and layers (transport, device, data, business . . . ); associated rules (behavior and decision-making heuristics); learning rules or adaptive processes; an interaction topology; and an environment.

Method to Store an IoT Infrastructure Architecture Design
  The method can include storing in a persistent storage the structured inventory of the sub-systems and their components and their associated configuration information in files (for example in XML, or RDS format).
Method to Analyze an IoT System
  The method to analyze the IoT system can include:
    The association of indicators reflecting the non-functional properties of the components, the sub-systems and the IoT system as modeled with the method above, with specific mathematical formula to compute them.
    The computation of non-functional indicators of each components
    The aggregation of the component indicators according the formula of the sub-system they belong to.
    The aggregation of the sub-systems indicators according the formula of the IoT system.
  The analysis adopts a bottom-up aggregation method which complements the top-down (systemic) modeling method decomposing the system hierachically.

Method to Generate the Code of an IoT Infrastructure.

The method can include the translation of the top-down and hierarchical graph description of IoT system in a structured descriptive and declarative intermediate language that can be translated in a code interpretable and executable by deployment systems (like Ansible, Puppet, Chef). This way, the IoT infrastructure can be automatically deployed and configured in a real environment.

Method to Capture the Non-Functional Properties of a Deployed IoT System

The proposed method can include leveraging the IoT system model defined by the method described above to collect relevant data, identify and quantify the non-functional properties of the IoT system and associate dedicated mathematical formula to compute them. As these indicators are already identified and predicted for a given architecture and configuration in the design phase for example by the simulator, the method consists in selecting, associating and normalizing time series of monitoring data that automatically generate these KPIs in the deployed system.

Method to Compare the Non-Functional Properties of an IoT System in Production with the Non-Functional Properties of the Designed System.

This method can include comparing the computed KPIs obtained from normalized measured data with the computed KPIs obtained from simulated data.

Method to Generate Recommendations

After comparison, targeted values and corresponding configurations are extracted and retrieved, communicated to the user.

Method to Generate Associated Code and Configuration Files to Remediate, Change or Optimize an IoT System or Component.

The method can include computing the Difference in Config file and by leveraging an inverse problem method, extracting the value of components and parameters to change the situation, based on previous simulations.

Description of Apparatus to Automatically Model Automatically an IoT System

Interactive System to Model an IoT System and an IoT Infrastructure Architecture An apparatus that enables the top-down description of an IoT system in zones, regions, layers and nodes to enable intuitive visualization, simulation or recursive analysis via a computer system (see also FIG. 10).

- The Apparatus exposes an intuitive user interface that enables a human user to select an IoT system canvas and to iteratively specify its configuration parameters via a puzzle-based interface.
- The Apparatus exposes also a programming interface that enables a program executed by a computing machine to select a IoT system canvas and to automatically specify the configuration parameters from files or other program.

The puzzle shown in FIG. 10, initially described above, is also defined by the points above.

Figure 15:
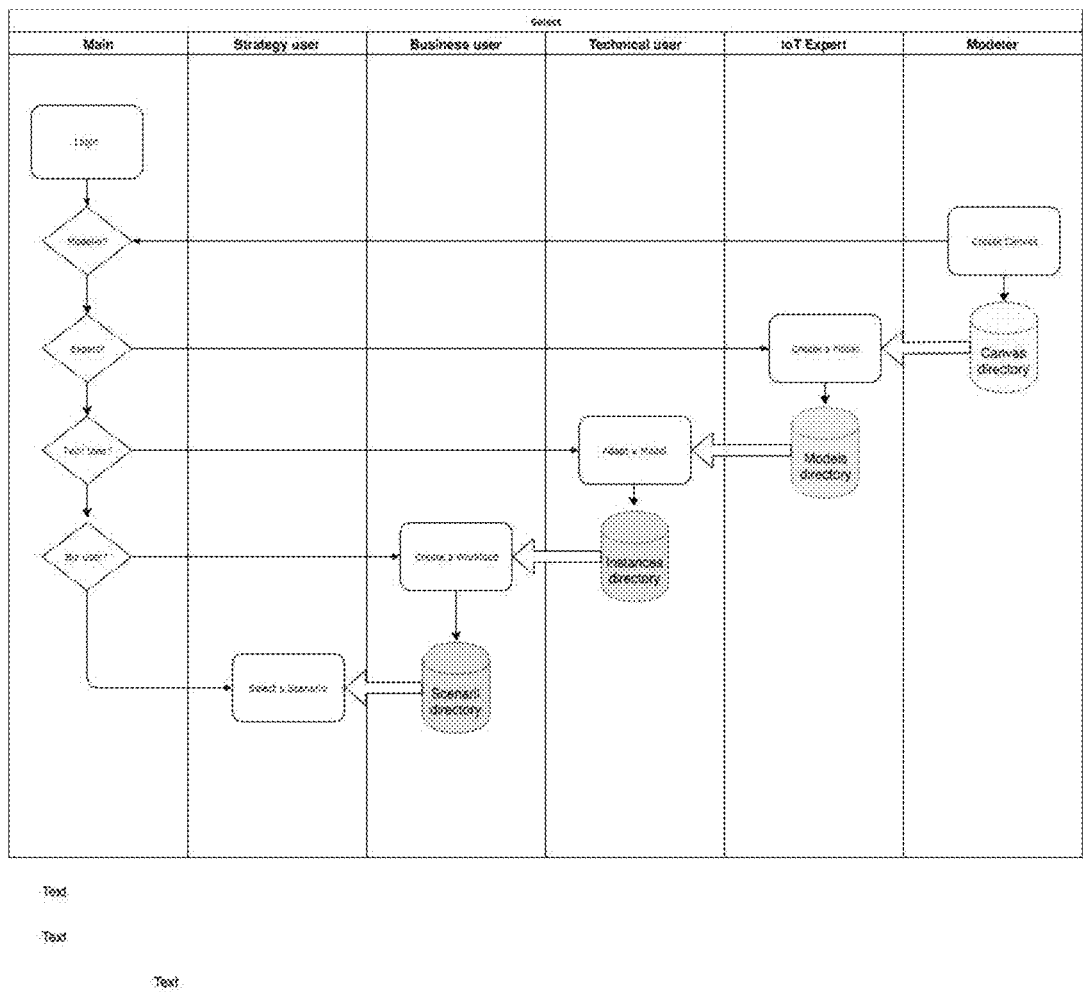
FIG. 15 is a flow diagram and graph showing principles of creating an IoT system in accordance with one embodiment.

FIG. 15 is a flow diagram of a process of preparing for a simulation. In one embodiment, this is done sequentially, but also collaboratively by a group of users. Each user has a role, and depending on her role she can create and fill different levels of the model from generic canvas down to very specific simulation scenarios.

An Interactive Model Definition Process can be implemented with a computer system with a workflow defined as follows:

Step 1: The user interface enables the user to select a system canvas from a library of canvases.

Step 2: The user interface displays the selected canvas as an interactive colored puzzle that enables the user to specify the details of the system model: instantiation of all the entities in each puzzle tile.

Step 3: The user interface presents the selected canvas as an interactive colored puzzle that enables the user to specify the details of the system model: initialization of all entities in each puzzle tile.

Step 4: Define the vertical relationships within nodes: cross-layer knitting

Step 5: Define the horizontal relationships between nodes: layer knitting

Figure 20:
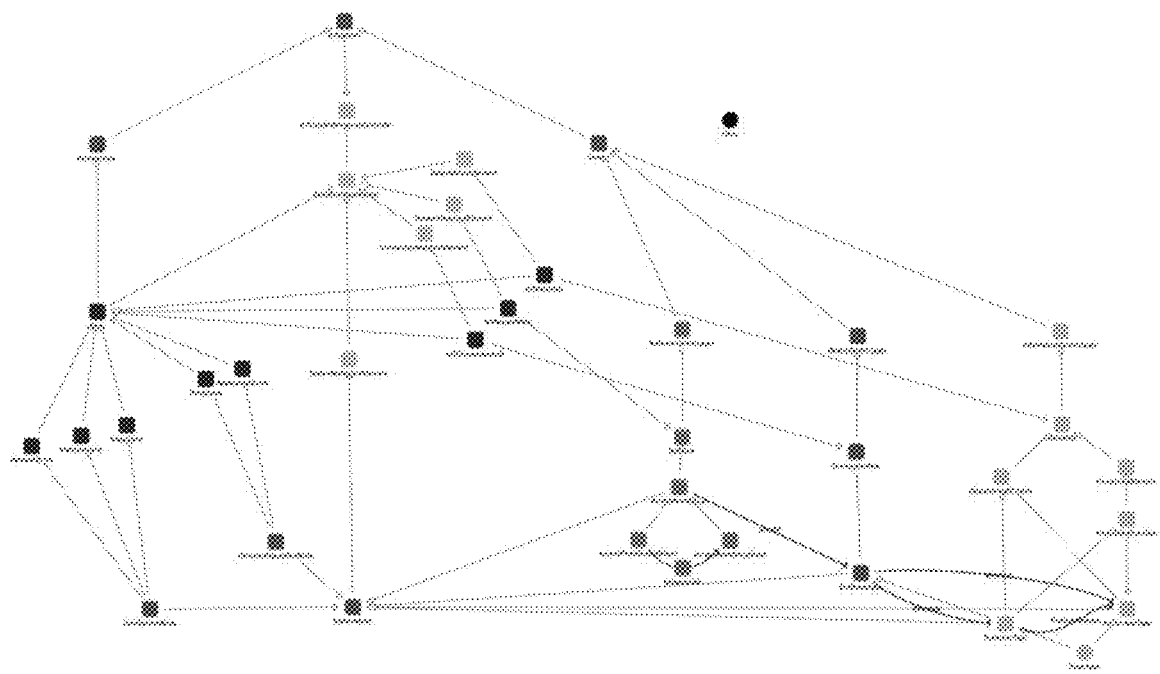
FIG. 20 is an illustration showing vertical and horizontal knitting in an end-to-end architecture in accordance with one embodiment.

FIG. 20 shows a process for cross-layer knitting and layer knitting as noted in Step 4 and Step 5 above. It also relates to the vertical and horizontal relationships as shown in FIG. 14. More specifically, FIG. 20 shows vertical and horizontal knitting in an end-to-end architecture. The vertical relationships are established within nodes: cross-layer knitting. The horizontal relationships are established between nodes: access points (AP) are linked at the network layer, connection end-points (EP) are linked at device centric layer, and publisher topics are linked with subscriber topics at an information centric layer.

Figure 17:
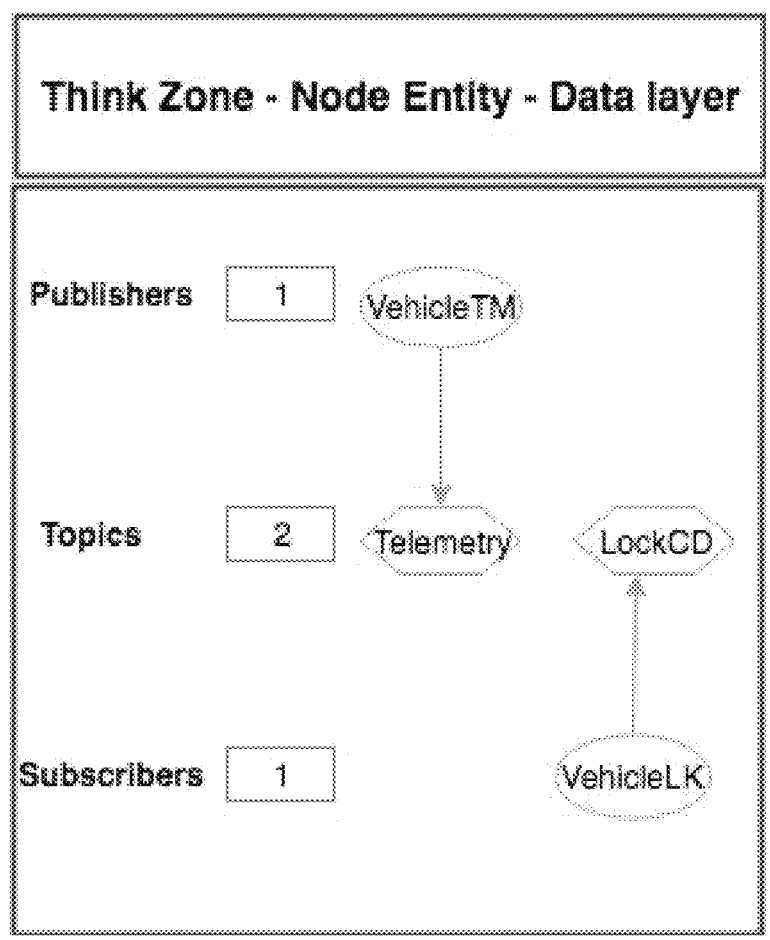
FIG. 17 is an illustration of a flow diagram of interactive coupling of a thing zone, node entity, and data layer in accordance with one embodiment.

FIG. 17 illustrates the Interactive System process to Model an IoT system architecture. All the generated files are stored in public libraries that can be accessed later for selection by the same user or a team member (if this role gives the corresponding access rights). This illustrates the implementation of some of the collaborative modeling features of the Apparatus. The libraries stored are, respectively, canvas, abstract models, instantiated models and workload scenarios. The user roles give specific access rights to these libraries for creation, selection or rating. User roles are for example: Modeler, IoT expert, Technical user, Business user or Strategy user.

Illustrative Example:

Based on a TENPA canvas selected (step 1), below is an example of the list of inputs a user interface automatically asks an IoT expert user to give to define and characterize the entities of the associated model (step 2).

For each zone, specify node types and network types.
    a) For each node type, specify each layer.
    b) For each network type specify attributes.

Then the user interface automatically asks the user to establish relationships within nodes
    ISM-DCM: For each publisher associate a corresponding connection End-point
    ISM-DCM: For each subscriber associate a corresponding connection End-point
    DCM-NCM: For each connection end-point associate corresponding Network Access point Then the user interface asks the user to define relationships across nodes, within layers:
    ISM: For each Topic, associate corresponding publisher and corresponding subscribers
    DCM: pair each connection end-points
    NCM: pair each Network Access Points Out and Network Access Point In Apparatus to Create an IoT System Simulator:

A system which enables the automated instantiation of IoT system entities models in layers and zones and the automated generation of the an IoT infrastructure model with attributes initial value settings to build a IoT system simulator with a simulator generator is described as follows:

- The system enables to execute a simulation program that computes the evolution of key entities that characterize the IoT system when submitted to a specific workload at each abstract level (zone and layer): Application, Data/Information, Topics/Messages, Connection/Session, Bandwidth, Compute, Storage capacities.

The simulated entities have attributes that evolve over time and characterize them unambiguously.

Formulas can be attached to entities to compute automatically the evolving value of parameters/attributes during the simulation of the system or during its actual runtime.

Probes are generated to collect the evolution of selected attributes throughout the simulation. The data collected can then displayed and exploited for analysis by a BI (Business Intelligence) tool adapted to this modeling and the IoT context.

Related to the description above is the scheduler of a simulation of an IoT system such as the one shown in FIG. 3.

System to Capture and Document an IoT Infrastructure Architecture

Module to store an IoT infrastructure architecture design

A mechanism to store in persistent storage the organization in zones and layers and nodes tree.

Module to Analyze an IoT system

An apparatus to explore IoT system KPIs globally, by zones, by regions and by layers and recursively by nodes according the nodes tree structure. FIG. 6 and FIG. 23 give examples of results that can be produced by such apparatus.

Module to generate the code of an IoT infrastructure.

A mechanism to generate the deployment code (for example for a tool like Ansible) for the virtual infrastructure from the file of the organization in zone, regions, tree of nodes and layers Module to Capture the non-functional properties of a deployed IoT system Computation of the properties.

Module to compare the non-functional properties of an IoT system in production with the non-functional properties of the designed system.

Collection of monitoring data and comparison/regressive.

Module to generate recommendations

An apparatus to explore IoT system KPIs Per zone, regions, layers and node organized in grid of interlaced graphs and associate recommendations to improve the situation accordingly.

FIG. 23 gives examples of results that can be produced by such apparatus.

Module to generate associated code and configuration files to remediate, change or optimize an IoT system or component.

Per zone, regions, layers and node organized in tree

Figure 22:
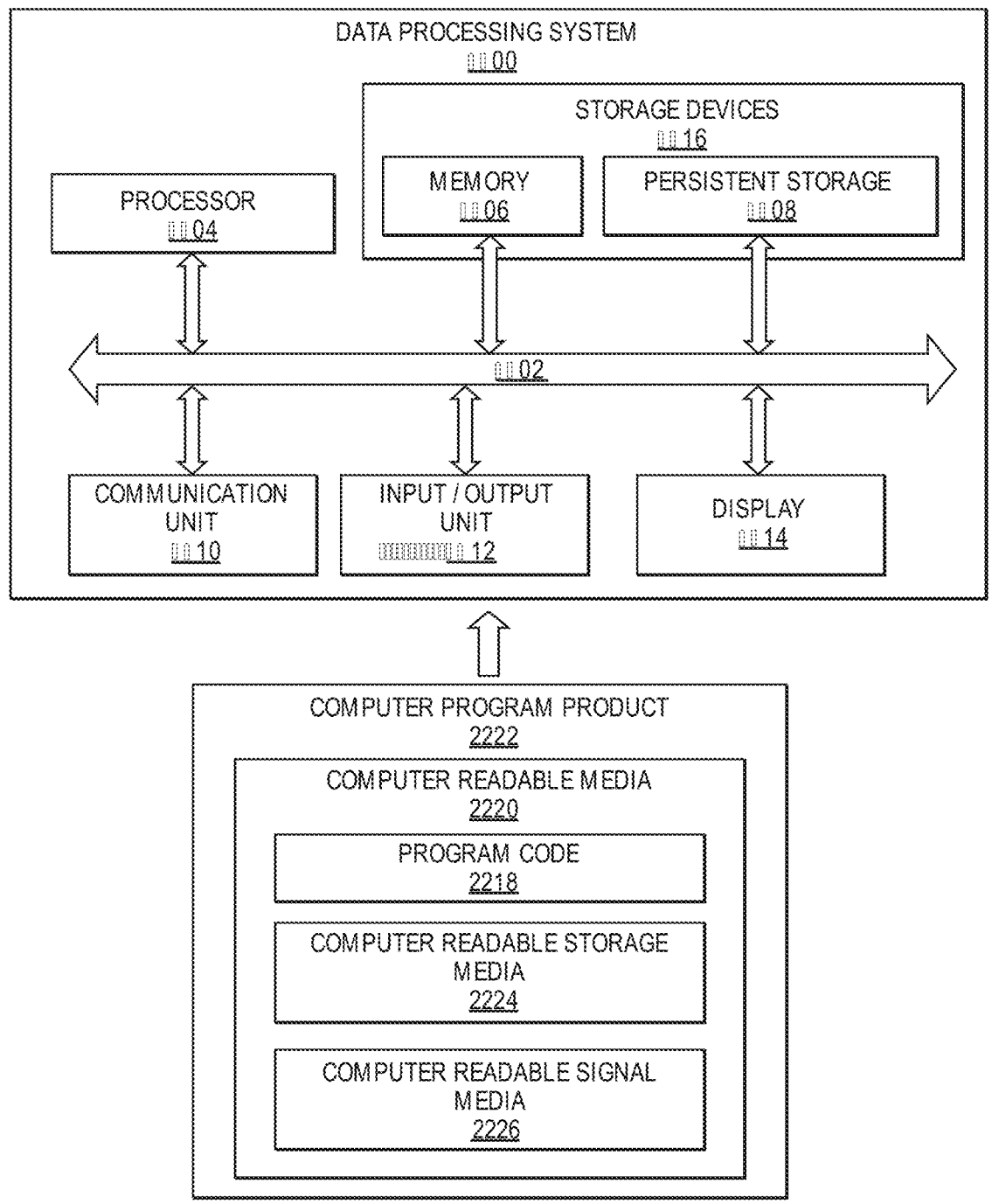
FIG. 22 is block diagram of a computer system for executing all methods and processes described herein.

FIG. 22 is an illustration of a computing device 2200 depicted in accordance with some embodiments. Computing device, also referred to as a data processing system 2200 may be used to implement one or more computers used in a controller or other components of various systems described above. In some embodiments, data processing system 2200 includes communications framework 2202, which provides communications between processor unit 2204, memory 2206, persistent storage 2208, communications unit 2210, input/output (I/O) unit 2212, and display 2214. In this example, communications framework 2202 may take the form of a bus system.

Processor unit 2204 serves to execute instructions for software that may be loaded into memory 2206. Processor unit 2204 may be a number of processors, a multi-processor core, or some other type of processor, depending on the particular implementation.

Memory 2206 and persistent storage 2208 are examples of storage devices 2216. A storage device is any piece of hardware that is capable of storing information, such as, for example, without limitation, data, program code in functional form, and/or other suitable information either on a temporary basis and/or a permanent basis. Storage devices 2216 may also be referred to as computer readable storage devices in these illustrative examples. Memory 2206, in these examples, may be, for example, a random access memory or any other suitable volatile or non-volatile storage device. Persistent storage 2208 may take various forms, depending on the particular implementation. For example, persistent storage 2208 may contain one or more components or devices. For example, persistent storage 2208 may be a hard drive, a flash memory, a rewritable optical disk, a rewritable magnetic tape, or some combination of the above. The media used by persistent storage 2208 also may be removable. For example, a removable hard drive may be used for persistent storage 2208.

Communications unit 2210, in these illustrative examples, provides for communications with other data processing systems or devices. In these illustrative examples, communications unit 2210 is a network interface card.

Input/output unit 2212 allows for input and output of data with other devices that may be connected to data processing system 2200. For example, input/output unit 2212 may provide a connection for user input through a keyboard, a mouse, and/or some other suitable input device. Further, input/output unit 2212 may send output to a printer. Display 2214 provides a mechanism to display information to a user.

Instructions for the operating system, applications, and/or programs may be located in storage devices 2216, which are in communication with processor unit 2204 through communications framework 2202. The processes of the different embodiments may be performed by processor unit 2204 using computer-implemented instructions, which may be located in a memory, such as memory 2206.

These instructions are referred to as program code, computer usable program code, or computer readable program code that may be read and executed by a processor in processor unit 2204. The program code in the different embodiments may be embodied on different physical or computer readable storage media, such as memory 2206 or persistent storage 2208.

Program code 2218 is located in a functional form on computer readable media 2220 that is selectively removable and may be loaded onto or transmitted to data processing system 2200 for execution by processor unit 2204. Program code 2218 and computer readable media 2220 form computer program product 2222 in these illustrative examples. In one example, computer readable media 2220 may be computer readable storage media 2224 or computer readable signal media 2226.

In these illustrative examples, computer readable storage media 2224 is a physical or tangible storage device used to store program code 2218 rather than a medium that propagates or transmits program code 2218.

Alternatively, program code 2218 may be transmitted to data processing system 2200 using computer readable signal media 2226. Computer readable signal media 2226 may be, for example, a propagated data signal containing program code 2218. For example, computer readable signal media 2226 may be an electromagnetic signal, an optical signal, and/or any other suitable type of signal. These signals may be transmitted over communications channels, such as wireless communications channels, optical fiber cable, coaxial cable, a wire, and/or any other suitable type of communications channel.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 2200. Other components shown in FIG. 22 can be varied from the illustrative examples shown. The different embodiments may be implemented using any hardware device or system capable of running program code 2218.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of modeling and simulating an IoT system, the method comprising:
   selecting an IoT system template, the IoT system template comprising a structure that includes a plurality of zones and one or more nodes in each of the plurality of zones, wherein the plurality of zones comprises a thing zone and an application zone, wherein the thing zone comprises items in direct interaction with a physical world, wherein such items produce interaction data based on the direct interaction, and wherein the application zone comprises entities executing logic based on the interaction data;
   defining a first node in the thing zone by indicating that the first node is a first node type, wherein the first node represents one or more clusters of hardware devices and/or software components;
   defining a second node in the application zone by indicating that the second node is the first node type, wherein the second node represents one or more clusters of hardware devices and/or software components;
   identifying that the first node and the second node form a functional layer across the thing zone and the application zone, wherein the functional layer is one of a hardware layer, a network layer, a device-centric layer, and an information-centric layer;
   specifying one indicator relating to a property of the IoT system;
   creating a passive model of the IoT system, the passive model comprising the structure and the functional layer;
   associating a simulator with the passive model;
   defining a simulation scenario;
   running the scenario using the associated simulator; and
   collecting indicator values of the IoT property.

2. The method as recited in claim 1, wherein the plurality of zones further comprises an edge zone, a wide area network zone, and a platform zone.

3. The method as recited in claim 2, wherein the edge zone comprises items associated with protocol adaptation, data filtering, data collection and pre-processing, and/or Internet connectivity capabilities, wherein the wide area network zone comprises items associated with long distance data transport, and wherein the platform zone comprises items associated with providing connection aggregation, security functions, and/or data management functions.

4. The method as recited in claim 2, further comprising:
   defining a third node in the edge zone by indicating that the third node is the first node type;
   defining a fourth node in the wide area network zone by indicating that the fourth node is the first node type;
   defining a fifth node in the platform zone by indicating that the fifth node is the first node type; and
   identifying that the functional layer is further formed by the third node, fourth node, and fifth node.

5. The method as recited in claim 1, wherein the functional layer is a first functional layer, and wherein the method further comprises:
   defining a third node in the thing zone by indicating that the third node is a second node type;
   defining a fourth node in the application zone by indicating that the fourth node is the second node type;
   identifying that the third node and the fourth node form a second functional layer across the thing zone and the application zone, wherein the second functional layer is another one of a hardware layer, a network layer, a device-centric layer, and an information-centric layer different from the first functional layer.

6. A method of creating a custom IoT model for an IoT system, the method comprising:
   creating a custom simulator and simulation scenario, wherein the customer simulator comprises a simulation structure that includes a plurality of zones and one or more nodes in each of the plurality of zones, wherein the plurality of zones comprises a thing zone and an application zone, wherein the thing zone comprises items in direct interaction with a physical world, wherein such items produce interaction data based on the direct interaction, wherein the application zone comprises entities executing logic based on the interaction data, and wherein the creating the custom simulator comprises:
   defining a first node in the thing zone by indicating that the first node is a first node type, wherein the first node represents one or more clusters of hardware devices and/or software components;
   defining a second node in the application zone by indicating that the second node is the first node type, wherein the second node represents one or more clusters of hardware devices and/or software components; and
   identifying that the first node and the second node form a functional layer across the thing zone and the application zone, wherein the functional layer is one of a hardware layer, a network layer, a device-centric layer, and an information-centric layer;
   running the simulation scenario on the custom simulator;
   creating a custom architecture of the IoT system and a deployment automation file;
   deploying the custom architecture;
   creating a custom monitoring design and monitoring automation file; and
   deploying the custom monitoring design.

7. The method as recited in claim 6, further comprising:
creating a custom reporting design and reporting automation file; and
deploying the custom reporting.

8. The method as recited in claim 6, wherein the plurality of zones further comprises an edge zone, a wide area network zone, and a platform zone.

9. The method as recited in claim 8, wherein the edge zone comprises items associated with protocol adaptation, data filtering, data collection and pre-processing, and/or Internet connectivity capabilities, wherein the wide area network zone comprises items associated with long distance data transport, and wherein the platform zone comprises items associated with providing connection aggregation, security functions, and/or data management functions.

10. The method as recited in claim 8, wherein the creating the custom simulator further comprises:
defining a third node in the edge zone by indicating that the third node is the first node type;
defining a fourth node in the wide area network zone by indicating that the fourth node is the first node type;
defining a fifth node in the platform zone by indicating that the fifth node is the first node type; and
identifying that the functional layer is further formed by the third node, fourth node, and fifth node.

11. The method as recited in claim 6, wherein the functional layer is a first functional layer, and wherein the creating the custom simulator further comprises:
defining a third node in the thing zone by indicating that the third node is a second node type;
defining a fourth node in the application zone by indicating that the fourth node is the second node type;
identifying that the third node and the fourth node form a second functional layer across the thing zone and the application zone, wherein the second functional layer is another one of a hardware layer, a network layer, a device-centric layer, and an information-centric layer different from the first functional layer.

12. A method of creating a simulated IoT system, the method comprising:
creating an IoT project template, wherein the IoT project template comprises a simulation structure that includes a plurality of zones and one or more nodes in each of the plurality of zones, wherein the plurality of zones comprises a thing zone and an application zone, wherein the thing zone comprises items in direct interaction with a physical world, wherein such items produce interaction data based on the direct interaction, and wherein the application zone comprises entities executing logic based on the interaction data;
creating an IoT project, wherein the IoT project utilizes the IoT project template;
adjusting attributes of the IoT project to create an IoT project model, wherein the adjusting the attributes comprises:
defining a first node in the thing zone by indicating that the first node is a first node type, wherein the first node represents one or more clusters of hardware devices and/or software components;
defining a second node in the application zone by indicating that the second node is the first node type, wherein the second node represents one or more clusters of hardware devices and/or software components; and
identifying that the first node and the second node form a functional layer across the thing zone and the application zone, wherein the functional layer is one of a hardware layer, a network layer, a device-centric layer, and an information-centric layer;
visualizing of the IoT project model;
simulating of the IoT project model;
deploying the IoT project model;
inputting deployment data into the IoT project model; and
storing a conceptual IoT model.

13. The method as recited in claim 12, further comprising:
monitoring the IoT project model;
optimizing the IoT project model; and
inputting the IoT project model with optimization data and monitoring data.

14. The method as recited in claim 12, wherein the plurality of zones further comprises an edge zone, a wide area network zone, and a platform zone.

15. The method as recited in claim 14, wherein the edge zone comprises items associated with protocol adaptation, data filtering, data collection and pre-processing, and/or Internet connectivity capabilities, wherein the wide area network zone comprises items associated with long distance data transport, and wherein the platform zone comprises items associated with providing connection aggregation, security functions, and/or data management functions.

16. The method as recited in claim 14, wherein the adjusting the attributes further comprises:
defining a third node in the edge zone by indicating that the third node is the first node type;
defining a fourth node in the wide area network zone by indicating that the fourth node is the first node type;
defining a fifth node in the platform zone by indicating that the fifth node is the first node type; and
identifying that the functional layer is further formed by the third node, fourth node, and fifth node.

17. The method as recited in claim 12, wherein the functional layer is a first functional layer, and wherein the adjusting the attributes further comprises:
defining a third node in the thing zone by indicating that the third node is a second node type;
defining a fourth node in the application zone by indicating that the fourth node is the second node type;
identifying that the third node and the fourth node form a second functional layer across the thing zone and the application zone, wherein the second functional layer is another one of a hardware layer, a network layer, a device-centric layer, and an information-centric layer different from the first functional layer.

\* \* \* \* \*